US008850762B2

(12) United States Patent
Knauf et al.

(10) Patent No.: US 8,850,762 B2
(45) Date of Patent: Oct. 7, 2014

(54) VERTICALLY ADJUSTABLE PARTITION WALL DOOR

(71) Applicant: Steelcase Inc., Grand Rapids, MI (US)

(72) Inventors: Marvin C. Knauf, Conklin, MI (US); Karl J. Mead, East Grand Rapids, MI (US); Beverly Jo Sugarbaker, Ada, MI (US); Jamie L. Payne, Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 14/029,003

(22) Filed: Sep. 17, 2013

(65) Prior Publication Data

US 2014/0075861 A1    Mar. 20, 2014

Related U.S. Application Data

(60) Provisional application No. 61/702,018, filed on Sep. 17, 2012, provisional application No. 61/702,008, filed on Sep. 17, 2012, provisional application No. 61/701,977, filed on Sep. 17, 2012, provisional application No. 61/701,969, filed on Sep. 17, 2012.

(51) Int. Cl.
*E06B 1/04* (2006.01)
*E04B 1/82* (2006.01)
*E05C 1/06* (2006.01)
*E04B 2/78* (2006.01)
*E06B 3/36* (2006.01)
*E06B 3/46* (2006.01)
*E06B 1/00* (2006.01)
*E04B 2/74* (2006.01)
*E05C 1/08* (2006.01)
*E04B 2/72* (2006.01)
*E04B 2/00* (2006.01)
*E04H 1/06* (2006.01)
*E04B 2/56* (2006.01)
*E05B 65/00* (2006.01)
*E06B 1/52* (2006.01)
*E05B 15/00* (2006.01)

(52) U.S. Cl.
CPC .......... *E04B 2/7453* (2013.01); *E04B 1/82* (2013.01); *E05C 1/06* (2013.01); *E04B 2/78* (2013.01); *E06B 3/36* (2013.01); *E06B 3/4654* (2013.01); *E06B 1/00* (2013.01); *E05C 1/08* (2013.01); *E05B 15/0053* (2013.01); *E04B 2/72* (2013.01); *E04B 2/00* (2013.01); *E04H 1/06* (2013.01); *E04B 2/721* (2013.01); *E04B 2/56* (2013.01); *E05B 65/006* (2013.01); *E06B 1/52* (2013.01)
USPC .................. 52/217; 52/212; 52/656.4

(58) Field of Classification Search
USPC .............. 52/211, 212, 213, 217, 204.1, 656.4
See application file for complete search history.

(56) References Cited

U.S. PATENT DOCUMENTS 1,614,318 A    1/1927   Ricken
1,826,981 A    10/1931  Baum
(Continued)

FOREIGN PATENT DOCUMENTS

AU    2007229317    9/2007
AU    2009201490    12/2009
(Continued)

*Primary Examiner* — William Gilbert
*Assistant Examiner* — Gisele Ford
(74) *Attorney, Agent, or Firm* — Price Heneveld LLP

(57) ABSTRACT

A vertically adjustable door assembly for use in a modular wall assembly includes a door opening defined by first and second door jamb assemblies which are adapted to receive vertical slider members in a channel disposed along a length of the door jamb assemblies. The slider members are vertically adjustable within the channels and include hinge mechanism such that either door jamb assembly can support a door member therefrom. Another aspect of the invention includes a vertically adjustable header assembly providing an aesthetically pleasing uniform appearance between the door assembly and the modular wall assembly.

20 Claims, 21 Drawing Sheets

(56) References Cited

U.S. PATENT DOCUMENTS

| | | | |
|---|---|---|---|
| 2,020,502 A | 11/1935 | Goddard | |
| 2,097,484 A | 11/1937 | Winslow | |
| 2,200,387 A | 5/1940 | Erath | |
| 2,255,554 A | 9/1941 | Gordon | |
| 2,595,506 A | 5/1952 | Backman | |
| 2,601,775 A | 7/1952 | Jewett | |
| 2,609,069 A | 9/1952 | McLaughlin | |
| 2,619,687 A * | 12/1952 | Kahn | 52/217 |
| 2,646,840 A | 7/1953 | Good | |
| 2,655,685 A | 10/1953 | Lewis | |
| 2,690,073 A | 9/1954 | McLaughlin | |
| 2,766,858 A | 10/1956 | Johnson | |
| 2,770,964 A | 11/1956 | Bigelow | |
| 2,781,559 A | 2/1957 | Adelard Savoie | |
| 2,843,232 A | 7/1958 | Goldberg | |
| 2,854,843 A * | 10/1958 | Lamb | 52/210 |
| 2,923,027 A | 2/1960 | Bury | |
| 2,952,150 A | 9/1960 | Matzkin | |
| 2,996,733 A | 8/1961 | Heffelfinger | |
| 3,017,657 A | 1/1962 | Mills | |
| 3,018,861 A | 1/1962 | Somville | |
| 3,066,770 A | 12/1962 | Millard | |
| 3,069,701 A | 12/1962 | McInerney | |
| 3,141,533 A | 7/1964 | Below | |
| 3,152,672 A | 10/1964 | Oppenhuizen | |
| 3,156,331 A | 11/1964 | Sklar | |
| 3,203,030 A | 8/1965 | Barnes | |
| 3,239,978 A | 3/1966 | Parker | |
| 3,265,416 A | 8/1966 | Downes | |
| 3,274,735 A | 9/1966 | Stackhouse | |
| 3,274,741 A | 9/1966 | Neagle | |
| 3,298,094 A | 1/1967 | Russell | |
| 3,324,599 A | 7/1967 | Brost | |
| 3,389,587 A | 6/1968 | Russell | |
| 3,429,076 A | 2/1969 | Fortsch | |
| 3,455,129 A | 7/1969 | Forbes | |
| 3,469,360 A * | 9/1969 | Carlson et al. | 52/217 |
| 3,473,265 A | 10/1969 | Norman | |
| 3,521,929 A | 7/1970 | Pearson | |
| 3,552,085 A | 1/1971 | Woodrum | |
| 3,567,278 A | 2/1971 | Barecki | |
| 3,571,995 A | 3/1971 | Kasprzak | |
| 3,571,996 A | 3/1971 | Braswell | |
| 3,590,419 A | 7/1971 | Dargene | |
| 3,604,155 A | 9/1971 | Brown et al. | |
| 3,628,299 A | 12/1971 | Nakazawa et al. | |
| 3,672,710 A | 6/1972 | Kroopp | |
| 3,676,966 A | 7/1972 | Ragland | |
| 3,702,549 A | 11/1972 | Solovieff et al. | |
| 3,769,773 A | 11/1973 | Mochizuki | |
| 3,774,345 A | 11/1973 | Cole et al. | |
| 3,812,621 A * | 5/1974 | Ragland | 49/505 |
| 3,828,394 A | 8/1974 | Horgan, Jr. | |
| 3,830,027 A | 8/1974 | Paisley et al. | |
| 3,830,030 A | 8/1974 | Yoshida | |
| 3,874,731 A | 4/1975 | Jordan | |
| 3,908,330 A | 9/1975 | Frach et al. | |
| 3,956,855 A | 5/1976 | Walker | |
| 4,009,659 A | 3/1977 | Schneider | |
| 4,015,382 A | 4/1977 | Noyes | |
| 4,052,819 A | 10/1977 | Beischel et al. | |
| 4,077,667 A | 3/1978 | Allerheiligen | |
| 4,179,849 A | 12/1979 | Kuffner | |
| 4,223,494 A | 9/1980 | Wendt | |
| 4,281,481 A | 8/1981 | Wendt | |
| 4,369,600 A | 1/1983 | Passovoy | |
| 4,403,452 A | 9/1983 | Urbanick | |
| 4,412,366 A | 11/1983 | Rock et al. | |
| 4,453,346 A | 6/1984 | Powell et al. | |
| 4,456,290 A | 6/1984 | Gross et al. | |
| 4,489,527 A | 12/1984 | Haas | |
| 4,498,702 A | 2/1985 | Raftery | |
| 4,513,549 A | 4/1985 | Wendt | |
| 4,518,476 A | 5/1985 | Delony et al. | |
| 4,535,503 A | 8/1985 | Narita et al. | |
| 4,601,923 A | 7/1986 | Bonato | |
| 4,623,114 A | 11/1986 | Nishino | |
| 4,689,853 A | 9/1987 | Marinoni | |
| 4,740,035 A | 4/1988 | Kazaoka et al. | |
| 4,775,260 A | 10/1988 | Kecmer | |
| 4,823,438 A | 4/1989 | Roloff | |
| 4,827,682 A | 5/1989 | Gildehaus | |
| 4,850,644 A | 7/1989 | Kazaoka et al. | |
| 4,861,104 A | 8/1989 | Malak | |
| 4,873,804 A | 10/1989 | Kukke | |
| 4,881,296 A | 11/1989 | Marinoni | |
| 4,897,889 A | 2/1990 | Baus | |
| 4,909,752 A | 3/1990 | Hallum et al. | |
| 5,058,347 A | 10/1991 | Schuelke et al. | |
| 5,060,920 A | 10/1991 | Engibarov | |
| 5,063,638 A | 11/1991 | Howard et al. | |
| 5,090,170 A | 2/1992 | Propst | |
| 5,100,201 A | 3/1992 | Becker, III et al. | |
| 5,154,019 A | 10/1992 | Day | |
| 5,205,072 A | 4/1993 | Eutebach | |
| 5,293,723 A | 3/1994 | Slessor | |
| 5,385,383 A | 1/1995 | Kreis et al. | |
| 5,403,109 A | 4/1995 | Johnson et al. | |
| 5,439,271 A | 8/1995 | Ryan | |
| 5,477,644 A | 12/1995 | Chenoweth, Jr. | |
| 5,525,005 A | 6/1996 | Chen | |
| 5,540,481 A | 7/1996 | Roossien et al. | |
| 5,551,795 A | 9/1996 | Engibarov | |
| 5,555,605 A | 9/1996 | Mosher | |
| 5,619,823 A | 4/1997 | Ruff et al. | |
| 5,689,922 A | 11/1997 | Daudet | |
| 5,700,105 A | 12/1997 | Salice | |
| 5,809,698 A | 9/1998 | Mori | |
| 5,845,439 A | 12/1998 | Hendley | |
| 6,033,145 A | 3/2000 | Xu et al. | |
| 6,058,665 A | 5/2000 | Halvorson, Jr. et al. | |
| 6,079,169 A | 6/2000 | Ashworth | |
| 6,141,925 A | 11/2000 | Halvorson, Jr. et al. | |
| 6,178,595 B1 | 1/2001 | Marinoni | |
| 6,250,016 B1 | 6/2001 | Gravel | |
| 6,393,782 B1 | 5/2002 | Berridge et al. | |
| 6,425,210 B1 | 7/2002 | Ricci | |
| 6,490,829 B1 | 12/2002 | Schreiner et al. | |
| 6,585,321 B1 | 7/2003 | Taguchi et al. | |
| 6,729,085 B2 | 5/2004 | Newhouse et al. | |
| 6,766,561 B1 | 7/2004 | Cheng | |
| 6,820,388 B2 | 11/2004 | Newhouse et al. | |
| 6,865,856 B2 | 3/2005 | Kim et al. | |
| 6,922,949 B2 | 8/2005 | Cornell et al. | |
| 6,994,401 B1 | 2/2006 | Fischer et al. | |
| 7,140,154 B2 | 11/2006 | Governale et al. | |
| 7,178,098 B2 | 2/2007 | Bauchot et al. | |
| 7,188,390 B2 | 3/2007 | Cheng | |
| 7,305,797 B2 | 12/2007 | Chiang | |
| 7,389,660 B2 | 6/2008 | Ebling | |
| 7,434,364 B2 | 10/2008 | MacDermott et al. | |
| 7,543,860 B2 | 6/2009 | Meeks et al. | |
| 7,546,718 B2 * | 6/2009 | Vasta | 52/632 |
| 7,571,516 B2 | 8/2009 | Lueffe et al. | |
| 7,571,574 B2 | 8/2009 | Yu | |
| 7,600,821 B2 | 10/2009 | Yasuda et al. | |
| 7,788,863 B2 | 9/2010 | Pepper et al. | |
| 7,818,926 B2 * | 10/2010 | Liu | 52/204.1 |
| 7,878,559 B2 | 2/2011 | Meeks et al. | |
| 7,926,879 B2 | 4/2011 | Schmitz et al. | |
| 7,971,319 B2 | 7/2011 | Becker et al. | |
| 7,984,598 B2 | 7/2011 | Gosling et al. | |
| 8,033,077 B2 | 10/2011 | Svendsen | |
| 8,210,611 B2 | 7/2012 | Aldrich et al. | |
| 8,282,169 B2 | 10/2012 | Schmitz et al. | |
| 2004/0128925 A1 | 7/2004 | Massey | |
| 2005/0125949 A1 | 6/2005 | Lin | |
| 2005/0193653 A1* | 9/2005 | Cornell | 52/204.1 |
| 2005/0198911 A1 | 9/2005 | Baczuk et al. | |
| 2007/0003745 A1* | 1/2007 | Edstrom et al. | 428/217 |
| 2008/0106136 A1 | 5/2008 | Heidmann et al. | |
| 2011/0099755 A1 | 5/2011 | Reichel | |

(56) References Cited

U.S. PATENT DOCUMENTS

| | | |
|---|---|---|
| 2011/0138732 A1 | 6/2011 | Piano |
| 2011/0219696 A1 | 9/2011 | Bultschneider |
| 2013/0099548 A1 | 4/2013 | Schmitz et al. |

FOREIGN PATENT DOCUMENTS

| | | |
|---|---|---|
| BR | 200403352 | 9/2005 |
| CA | 2358157 | 4/2002 |
| CA | 2389508 | 12/2002 |
| CA | 2310869 | 8/2003 |
| CN | 101363244 | 2/2009 |
| DE | 8712452 | 10/1987 |
| DE | 202004016792 | 3/2005 |
| EP | 0517386 | 12/1992 |
| EP | 1342859 | 9/2003 |
| EP | 2199480 | 6/2010 |
| JP | 1122074 | 1/1999 |
| JP | 2005068668 | 3/2005 |
| JP | 2005068807 | 3/2005 |
| JP | 2005299100 | 10/2005 |
| JP | 2006138106 | 6/2006 |
| JP | 2010203048 | 9/2010 |
| KR | 20110004461 U | 5/2011 |
| WO | 2007106933 | 9/2007 |
| WO | 2008116741 | 10/2008 |

* cited by examiner

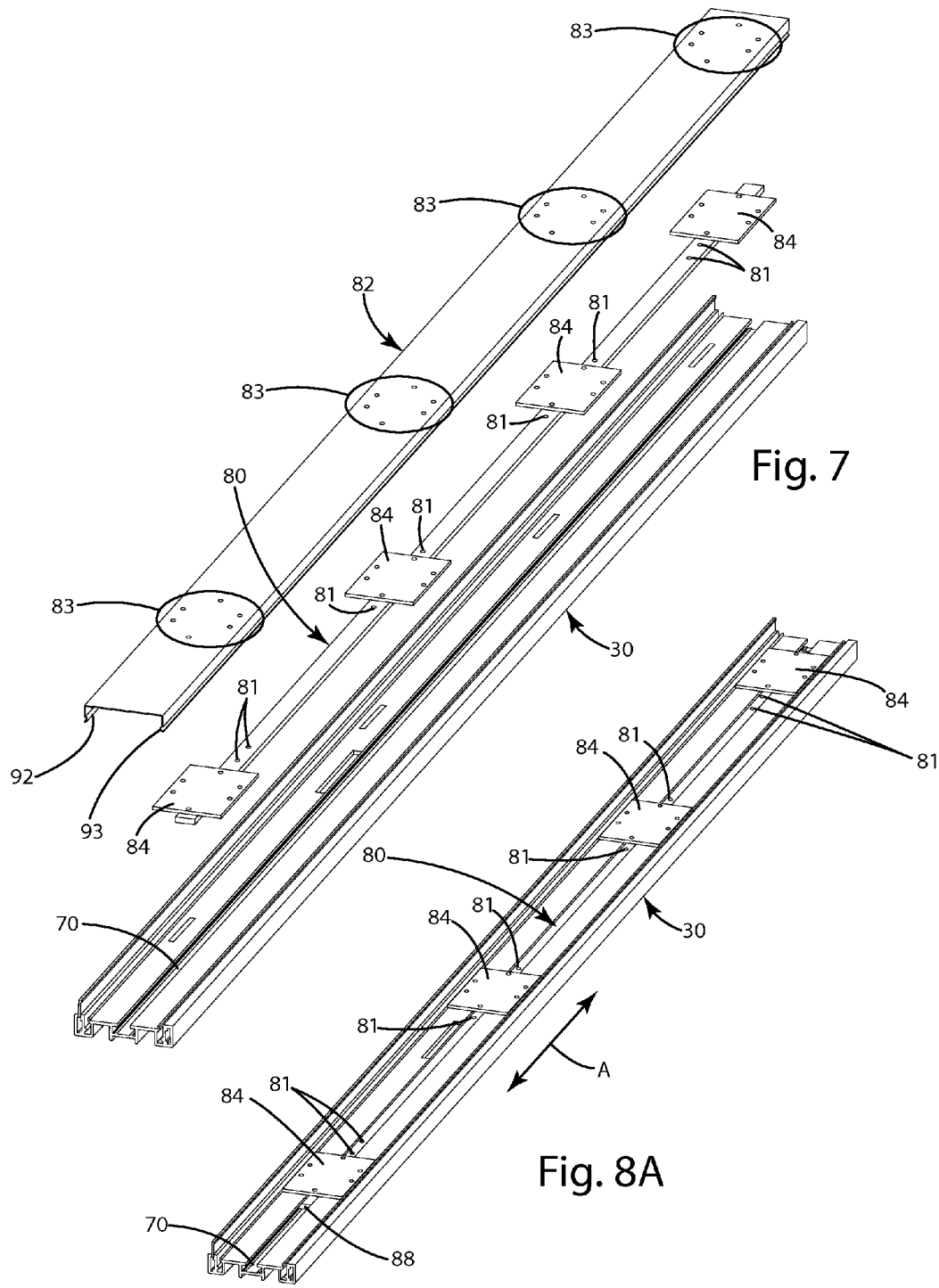

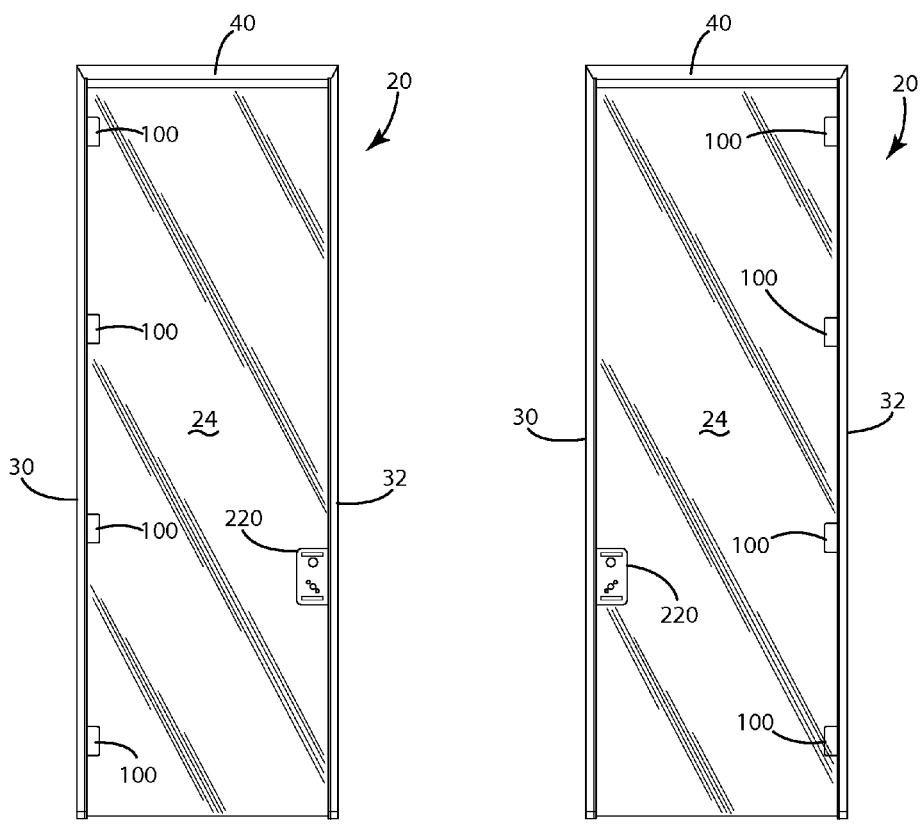

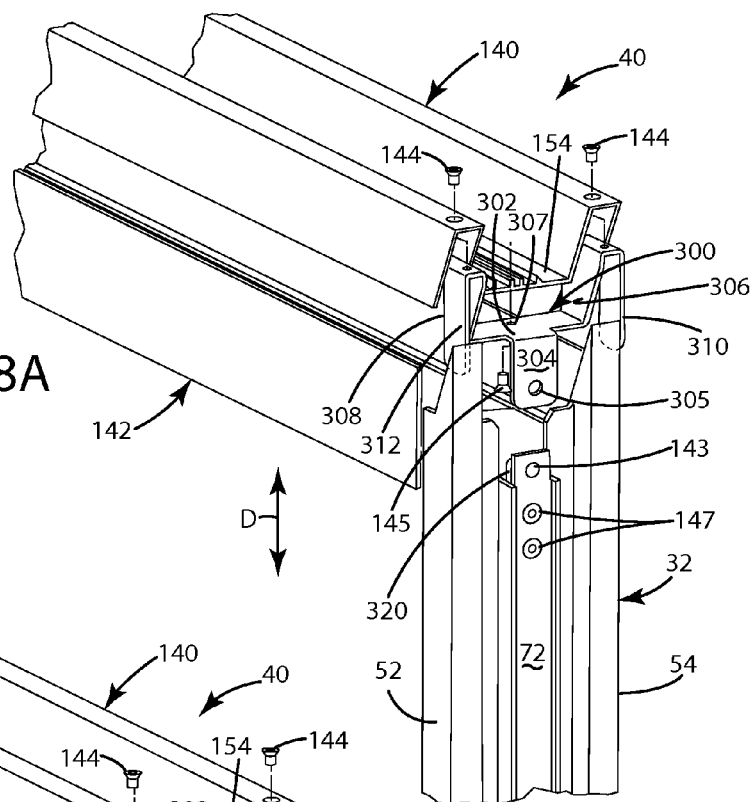
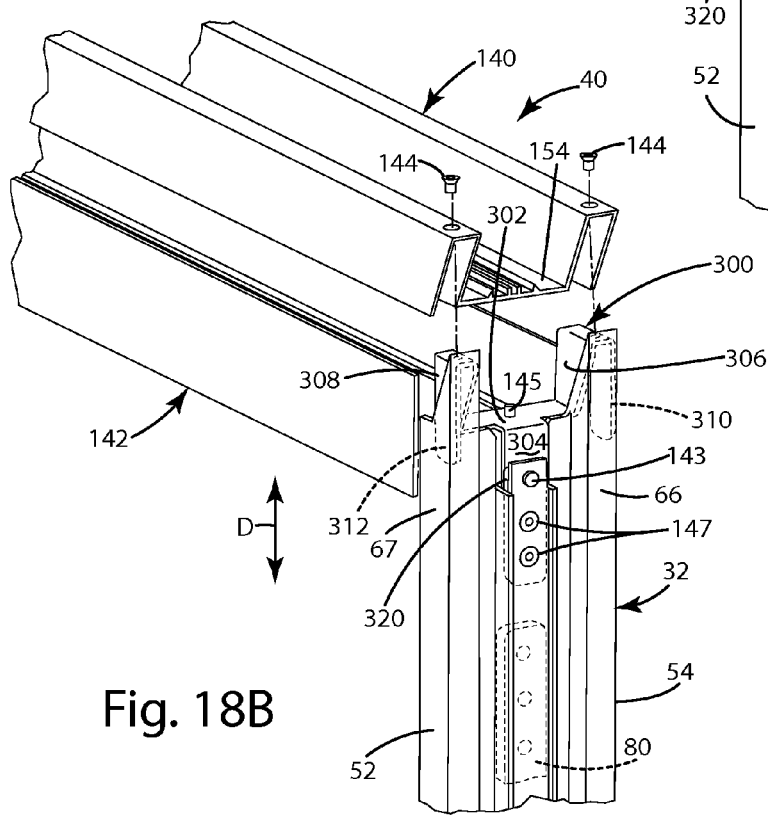
Fig. 18A
Fig. 18B

VERTICALLY ADJUSTABLE PARTITION WALL DOOR

CROSS-REFERENCE TO RELATED APPLICATIONS

This application claims benefit of U.S. Provisional Application No. 61/702,018, filed Sep. 17, 2012, entitled "FLOOR-TO-CEILING PARTITION WALL ASSEMBLY"; U.S. Provisional Application No. 61/702,008, filed Sep. 17, 2012, entitled "VERTICALLY ADJUSTABLE DOOR ASSEMBLY"; U.S. Provisional Application No. 61/701,977, filed Sep. 17, 2012, entitled "MONITOR MOUNT ASSEMBLY"; and U.S. Provisional Application No. 61/701,969, filed Sep. 17, 2012, entitled "SLIDING DOOR ASSEMBLY", the entire contents of which are incorporated herein by reference.

FIELD OF THE INVENTION

The present invention generally relates to a door assembly for partition arrangements for open office spaces and the like, and in particular to a vertically adjustable door assembly that is reversible to suit a wide variety of configurations in open offices spaces.

BACKGROUND OF THE INVENTION

Partition systems for open office spaces, and other similar settings, are well known in the art. Individual partition panels are interconnected in different configurations to form separate offices, workstations, or work settings. The partition panels are extremely durable and can be readily disassembled and reassembled into alternative configurations to meet the ever-changing needs of the user.

Partition systems can be adapted to provide privacy in some areas, generally using a floor-to-ceiling partition systems, while also allowing for open communication in other areas, which is better provided by low height, see-over partition systems.

The finishing, fitting-out or build-out of open building spaces for offices and other similar environments has become a very important aspect of effective space planning and layout. Work patterns, technology, and business organizations are constantly evolving and changing and so too are the needs of each individual user. The building space users require products which facilitate change at lower costs while also having the adaptability necessary to provide a clean and uniform aesthetic appearance in assembly. Changing technology and changing work processes demand that a design and installation be able to support and anticipate change. At the same time, appearance of the building space has become increasingly important to customers and occupants, particularly as companies have realized the importance and positive (or negative) effect on worker's attitudes and their ability to do a job efficiently. Accordingly, one very important requirement for a floor-to-ceiling partition wall assembly is an adjustable door assembly providing user privacy as well as a novel attractive appearance.

BRIEF SUMMARY OF THE INVENTION

One aspect of the present invention includes a modular wall assembly having a frame assembly and first and second door jamb assemblies operably coupled to the frame assembly and disposed in a generally parallel, laterally spaced-apart relationship. The first and second door jamb assemblies are configured to be abuttingly supported on a floor surface at lower portions thereof. Each door jamb assembly includes a jamb housing defining a longitudinal extending channel disposed along a length of the jamb housing. A header assembly, having opposite ends thereof, is operably connected to upper portions of the first and second door jamb assemblies to define a door opening. A door member is operable between a closed position, wherein the door member is at least partially located within the door opening, and an open position, wherein the door member is at least partially removed from the door opening to allow ingress and egress through the door opening. A first slider member is slidably received in the channel of the jamb housing either the first door jamb assembly or the second door jamb assembly. The slider member includes one or more mounting plates adapted to receive a hinge assembly for operable coupling the door member to the slider member. The first slider member is vertically adjustable along a length of the channel of the door jamb housing in assembly.

Another aspect of the present invention includes a modular wall assembly having a frame assembly and first and second door jamb assemblies operably coupled to the frame assembly. A header assembly includes a first header member having at least one channel. The first header member is operably connected to upper portions of the first and second door jamb assemblies to define a door opening. A second header member is at least partially received in the a channel of the first header member, and is vertically adjustable relative to the first header member in assembly.

Yet another aspect of the present invention includes a modular wall assembly having a frame assembly and a vertically adjustable door assembly. The vertically adjustable door assembly includes a first door jamb assembly and a second door jamb assembly operably coupled to the frame assembly and disposed in a generally parallel, laterally spaced-apart relationship. Each door jamb assembly includes a longitudinal extending channel and is adapted to be supported in a generally upright configuration relative to a floor surface. A header assembly, having opposite ends thereof, is operably connected to upper portions of the first and second door jamb assemblies to define a door opening. A door member is operable between a closed position, wherein the door member is at least partially located within the door opening, and an open position, wherein the door member is at least partially removed from the door opening to allow ingress and egress through the door opening. A slider member is slidably received in and vertically adjustable along a length of the channel of the first door jamb assembly. The slider member hingedly supports the door member between the open and closed positions.

These and other features and advantages of the present invention will be further understood and appreciated by those skilled in the art by reference to the following specification, claims, and appended drawings.

BRIEF DESCRIPTION OF THE DRAWINGS

In the drawings:

FIG. 7 is an exploded perspective view of a door jamb assembly, a slider member and a cover member;

FIG. 8A is a perspective view of the door jamb assembly of FIG. 7 having the slider member of FIG. 7 disposed therein with hinge mounting plates coupled thereto;

FIG. 15A is a side elevational view of a door assembly having a left hand door configuration;

FIG. 15B is a side elevational view of a door assembly having a right hand door configuration;

FIG. 18A is an exploded perspective view of the header assembly and a connecting bracket;

FIG. 18B is an exploded view of the header assembly with a door jamb assembly shown in phantom;

DETAILED DESCRIPTION OF THE PREFERRED EMBODIMENTS

Figure 1:
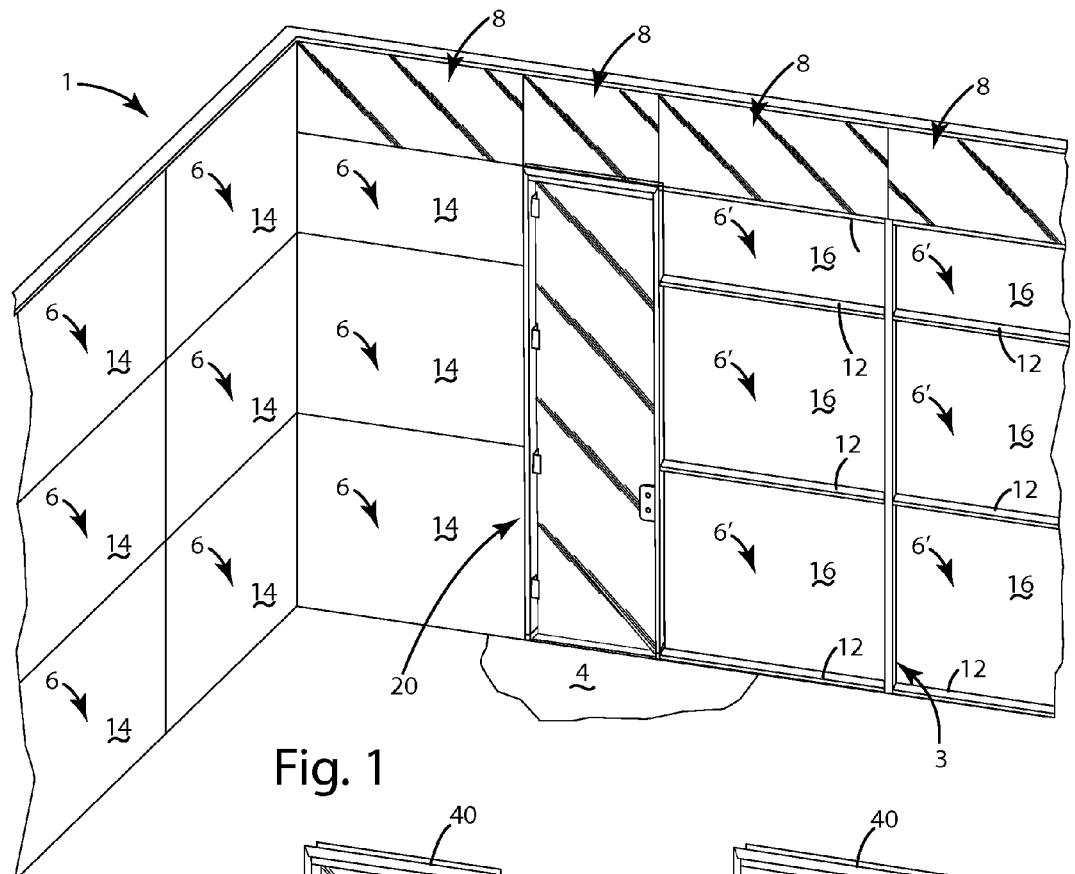
FIG. 1 is a perspective view of a panel wall system having a door assembly according to embodiments of the present invention.

For the purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in following specification, are simply exemplary embodiments. Hence, specific dimensions and other physical characteristics relating to the embodiments disclosed herein are not to be construed as limiting, unless expressly stated otherwise.

Referring now to FIG. 1, the reference numeral 1 generally designates a reconfigurable floor-to-ceiling panel wall system, which is particularly designed for use in office spaces, and other similar work environments. In the illustrated example, the panel wall system 1 includes various types of skin assemblies shown in FIG. 1 as solid or opaque skin or panel assemblies 6, 6' and translucent or glass skin assemblies 8 supported in a floor-to-ceiling arrangement. The translucent or glass skin assemblies 8 are captured glass assemblies that are adapted to allow light to pass therethrough for illuminating an office space arrangement as dictated by a user's design preferences. The solid panel assemblies 6 generally include an outer facing aesthetic surface 14, as shown with respect to panel assemblies 6, and an inwardly facing inner surface 16, as shown with respect to panel assemblies 6'. As illustrated in FIG. 1, various panel assemblies have been removed to reveal a frame system or assembly 3 made up of a plurality of vertical frame members 10 and horizontal frame members 12 which support the various skin assemblies 6, 6' and 8 in assembly. As shown in FIG. 1, the panel wall system also includes a door assembly 20, according to an embodiment of the present invention, which is coupled to the frame assembly 3.

Figures 2, 3:
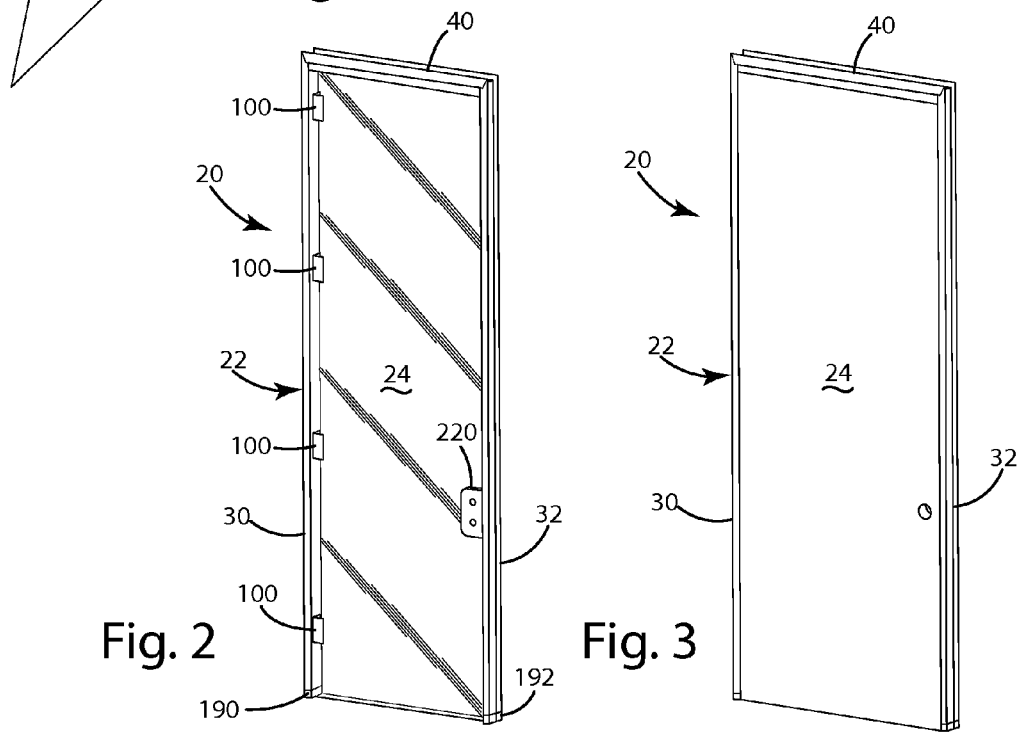
FIG. 2 is a perspective view of a door assembly having a glass door member.
FIG. 3 is a perspective view of a door assembly having a solid door member.
Figure 4C:
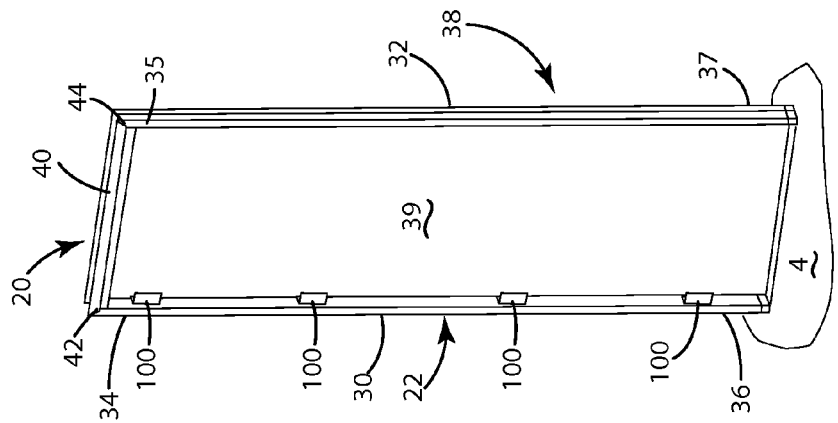
FIGS. 4B-4C are perspective views of a door frame assembly.
Figure 4B:
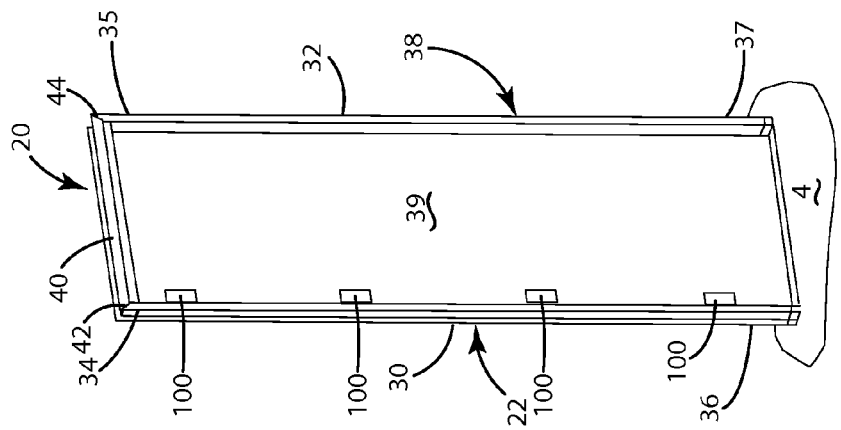
Figure 4A:
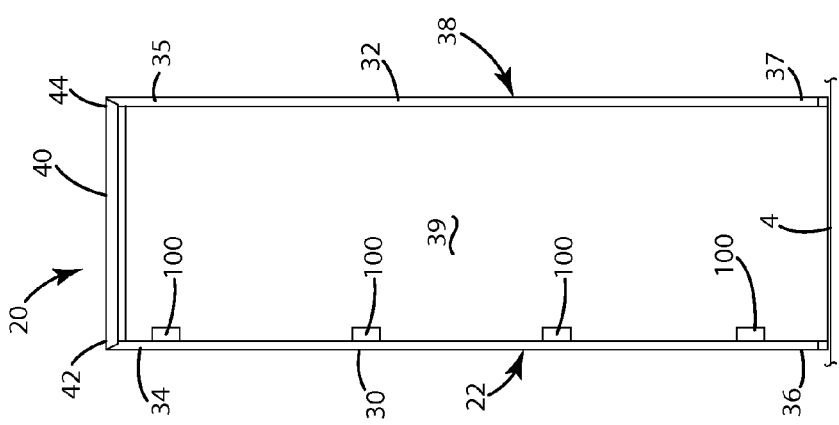
FIG. 4A is a side elevational view of a door frame assembly.

Referring now to FIGS. 2 and 3, the door assembly 20 includes a door frame assembly 22 which is adapted to support a door member 24, such as a glass door member shown in FIG. 2, or a solid door member shown in FIG. 3. The door member 24 is pivotally supported on the door frame assembly 22 by hinge assemblies 100 and operable between open and closed positions as further described below.

Referring now to FIGS. 4A-4C and 5, the door frame assembly 22 includes a first door jamb assembly 30 disposed on a left side, and a second door jamb assembly 32 disposed on a right side, such that the door jamb assemblies 30, 32 are configured in a generally parallel, laterally spaced apart relationship, and further configured to be abuttingly supported on a floor surface 4 at lower portions 36, 37 in a generally upright orientation. A header assembly 40 has a first side 42 and a second side 44, comprising opposite ends thereof, which are operably coupled to upper portions 34, 35 of the first and second door jamb assemblies 30, 32, thereby cooperating to define a rigid door 38 frame having a centrally disposed vertically extending window 39 for receiving a door member therein, such as door member 24 shown in FIG. 2.

Figure 5:
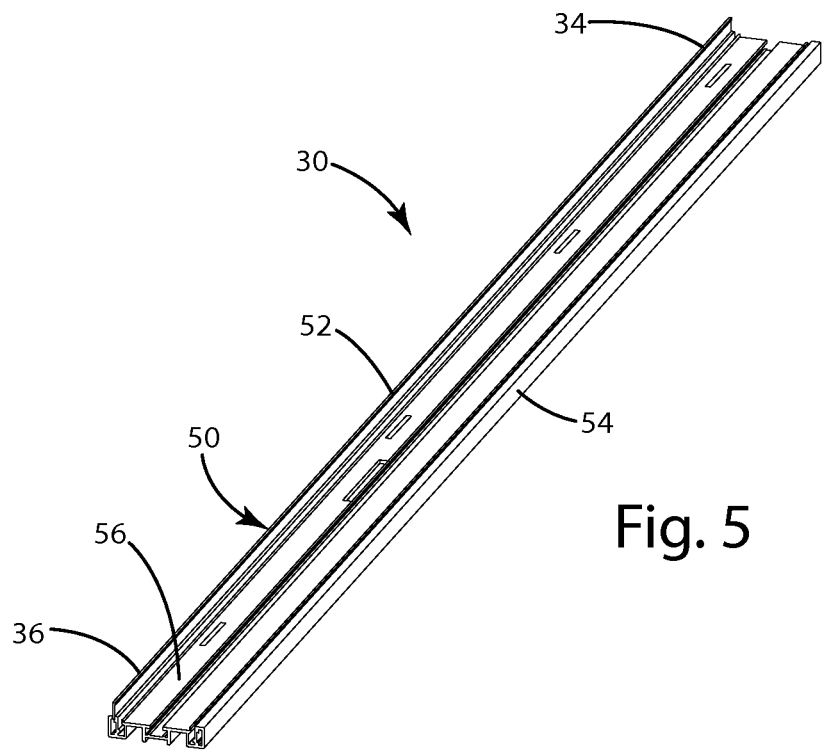
FIG. 5 is a perspective view of a door jamb assembly.
Figure 6:
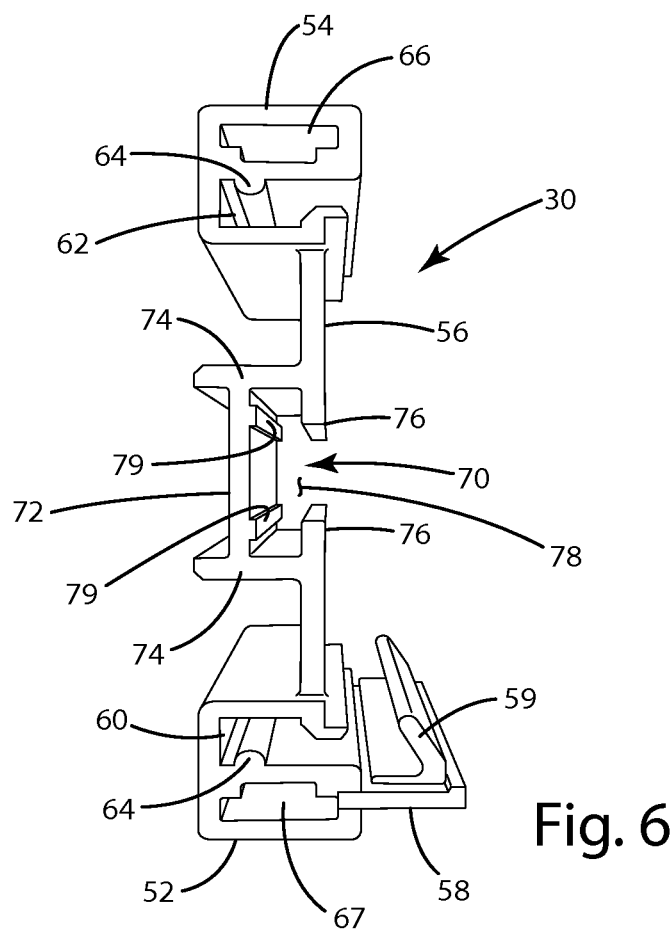
FIG. 6 is a top perspective view of a door jamb assembly.

Referring now to FIGS. 5 and 6, each door jamb assembly 30 (and 32) includes a longitudinally extending jamb housing 50 having a first side 52 and a second side 54 with a body portion 56 disposed there between. As best illustrated in FIG. 6, the first side 52, is generally disposed on the front of the door assembly as positioned in a panel wall system. A door stop 58 extends orthogonally from the door jamb assembly 30 and is designed to abut the door member 24 in assembly. The door stop 58 is a generally planar member and includes a sealing strip 59 that seals against the door member 24 in assembly. The sealing strip 59 is a continuous strip that can be cut to length in the field at the time of assembly to correspond to the length of the door stop flange 58. The second side 54 is generally disposed on the rear of the door assembly as positioned in a panel wall system 1. The first and second sides 52, 54 further comprise channels 60, 62 which are adapted to receive engagement portions of a cover member as further described below. Each channel 60, 62 includes an engagement feature 64 in the form a ridge shown in FIG. 6 which is adapted to retain a cover member on the door jamb assembly as further described below.

As shown in FIGS. 5 and 6, the longitudinally extending jamb housing 50 further defines a longitudinally extending interior passage or channel 70 that is generally centrally disposed on the body portion 56 of the jamb housing 50 and runs a length of the jamb housing 50. Channel 70 generally opens laterally towards the vertically extending window 39 in assembly.

For purposes of identification, the left or first door jamb assembly 30 is described above, however, one of ordinary skill in the art will understand that the right or second door jamb assembly 32 also comprises a similar configuration, for which the reference numerals of the features identified in describing door jamb assembly 30 above will also be used with reference to the features disposed on door jamb assembly 32, accept where indicated otherwise.

Figure 8B:
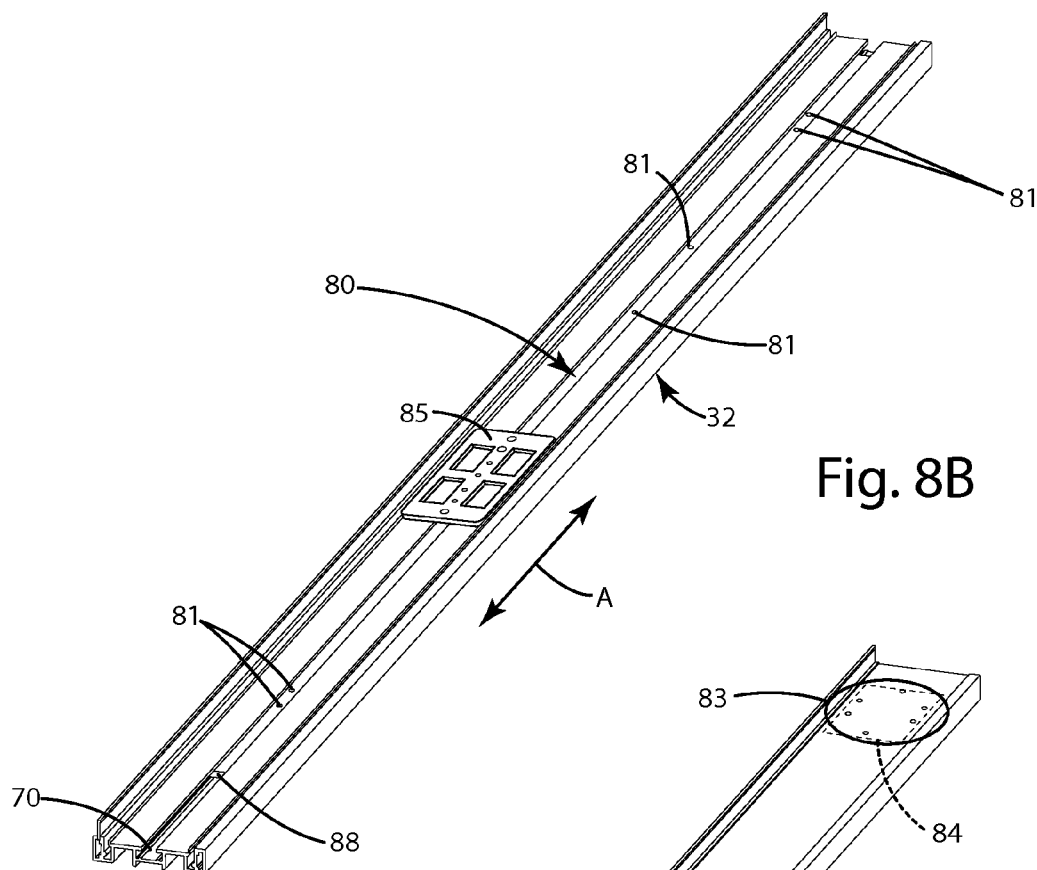
FIG. 8B is a perspective view of a door jamb assembly and a slider member having a latch striker disposed thereon.
Figure 9:
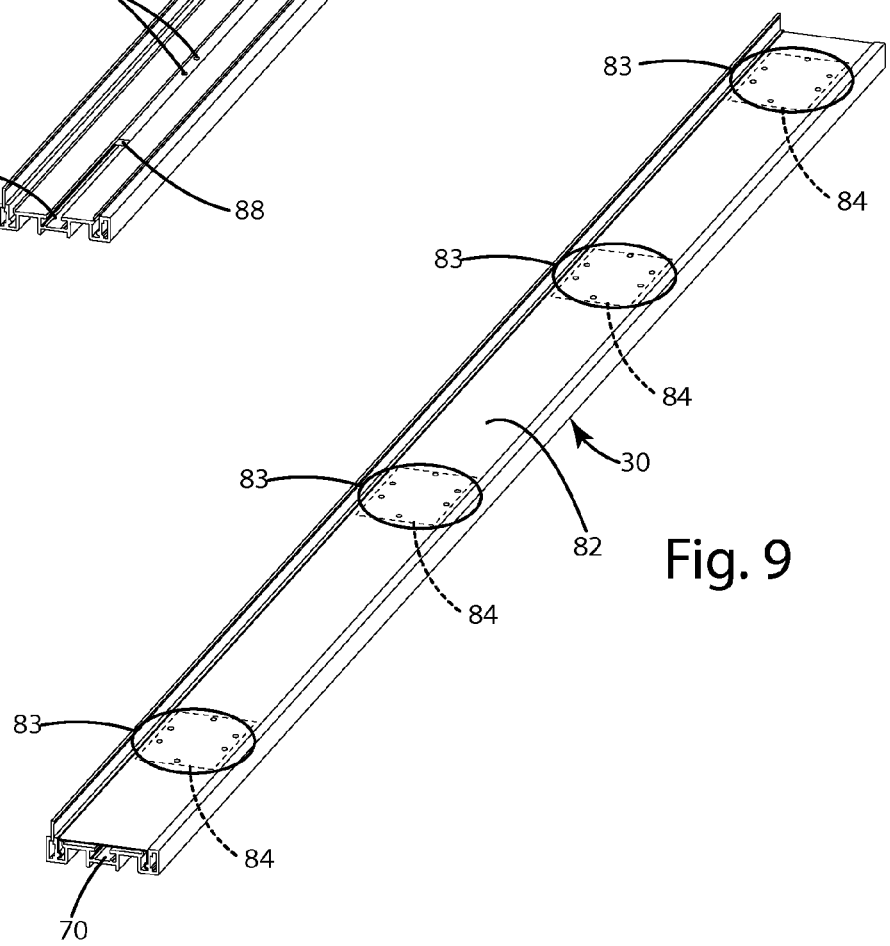
FIG. 9 is a perspective view of the door jamb assembly of FIG. 7 having the cover member disposed thereon.
Figure 20:
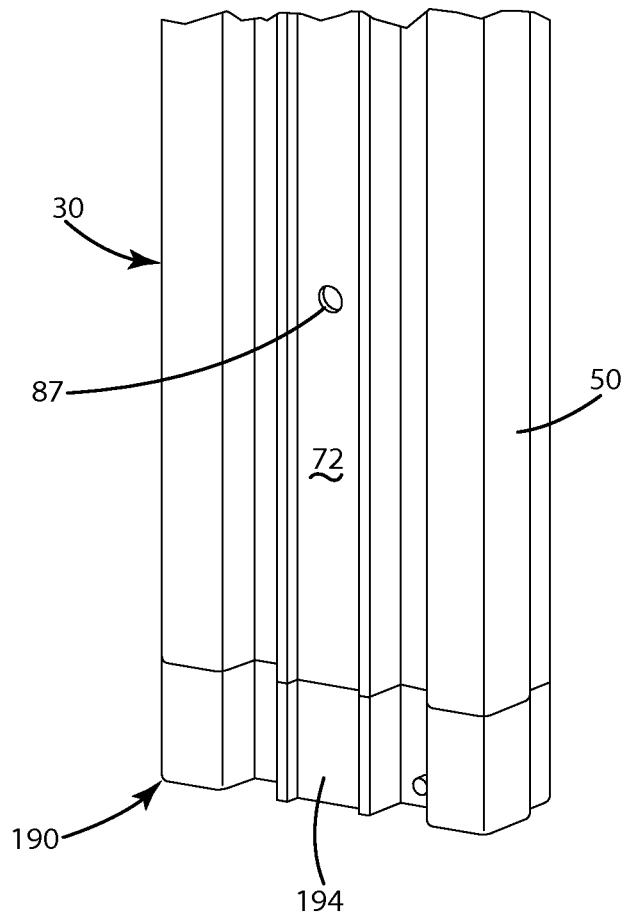
FIG. 20 is a perspective view of a lower portion of a door jamb assembly having a plinth assembly disposed thereon.
Figure 22:
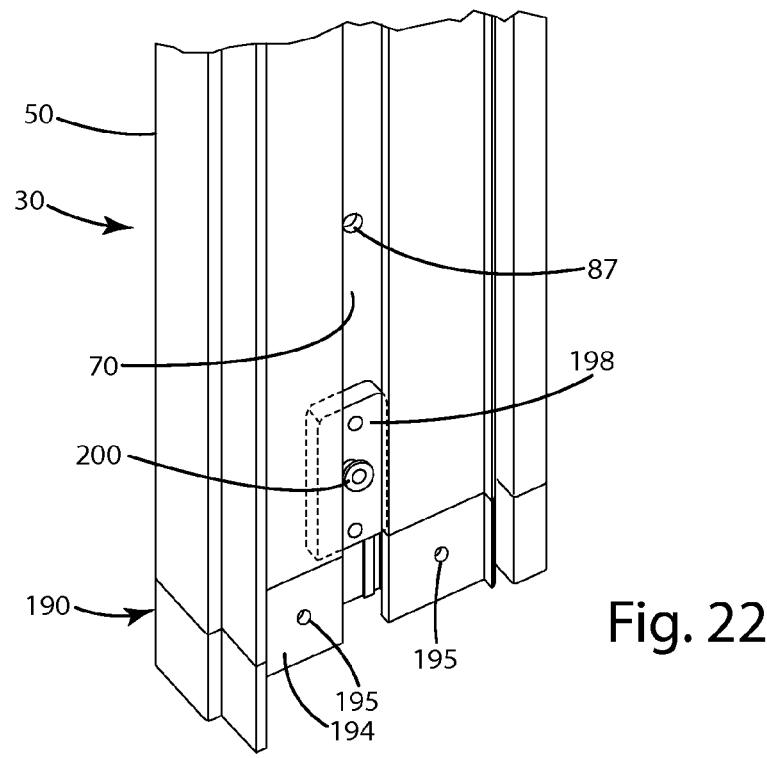
FIG. 22 is a perspective view of a lower portion of a door jamb assembly having a plinth assembly disposed thereon.

Referring now to FIGS. 7-9, each door jamb assembly 30 (and 32) further includes a longitudinally extending slider member 80 slidably received within the interior passage 70 and an aesthetic outer cover member 82 snap-coupled with the jamb housing 50 as shown in FIG. 9. The door jamb assemblies 30, 32 further include system mounting apertures 87 which are used with system fasteners 88 (shown in FIGS. 8A and 11-13) to secure the door jamb assemblies 30, 32 to the frame assembly 3 of the panel wall system 1. Apertures 87 are best shown in FIGS. 20 and 22 and are disposed at the lower portions 36, 37 of the door jamb assemblies 30, 32 in the bottom wall 72 of channel 70. As shown in FIGS. 7 and 8A, hinge mounting plates 84 are secured to the slider member 80 via mechanical fasteners such as screws to define a hinge slider. When the slider member 80 is disposed within channel 70 of the door jamb housing 50, the hinge mounting plates 84 are then spaced along a length of the jamb housing 50. Thus, slider member 80 is vertically adjustable along a length of the door jamb housing 50 within channel 70 as indicated by arrow A after the door jamb assemblies 30, 32 have been secured to the frame assembly 3. The slider assembly 80 is set in place along channel 70 by mechanical fasteners, such as screws, which pass through pre-drilled holes 81 disposed along a length of the slider member 80 and which further secure the slider member 80 to channel 70 by coupling to bottom wall 72 of channel 70. Hinge assemblies 100, as shown in FIG. 2, are used to secure a door member 24 to the hinge mounting plates 84 in assembly as further described below. The hinge assemblies 100 are mounted over the cover 82 through pre-drilled hinge mounting apertures 83 shown in FIGS. 7 and 9. As shown in FIG. 9, the pre-drilled hinge mounting apertures 83 are disposed over the hinge mounting plates 84 shown in phantom in FIG. 9. As shown in FIG. 8B, a latch striker 85 in the form of a plate may be secured to a slider member 80 to define a latch slider. Thus, in assembly, one door jamb assembly will have hinge mounting plates 84 disposed thereon for pivotally mounting a door member to the door frame assembly, while the other opposite door jamb assembly can have a latch striker 85 disposed thereon for accommodating a latch feature of the door member. In this way, the system includes a hinge slider and a latch slider that are both vertically adjustable along a path as indicated by arrow A in FIGS. 8A and 8B.

It is noted that all partition assemblies can be vertically adjusted above a ground surface so as to compensate for varying floor surfaces which may be uneven. As a result, the door assembly 20 must also be vertically adjustable with respect to the panel wall system 1, shown in FIG. 1, so as to maintain consistent lines, such as a constant floor line, between the supporting floor surface and the bottom edge of the door member.

Figure 11:
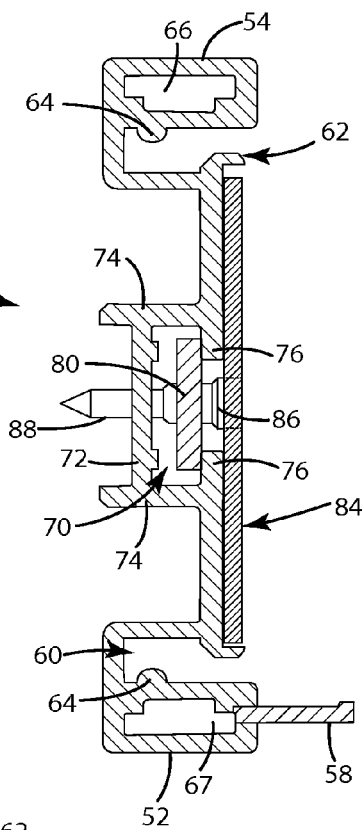
FIG. 11 is a top plan view of the door jamb assembly of FIG. 8.
Figure 12:
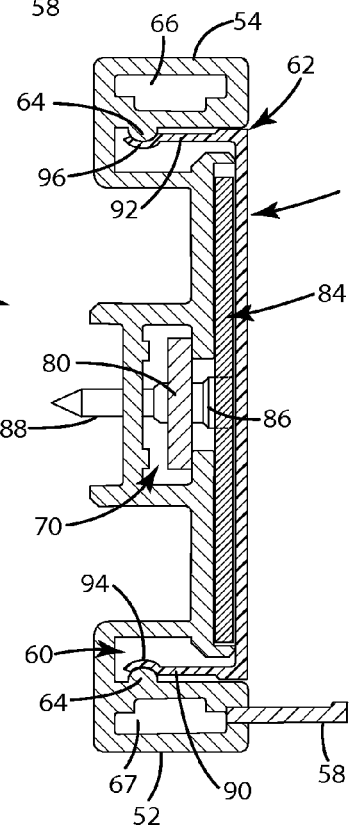
FIG. 12 is a top plan view of the door jamb assembly of FIG. 9.

In assembly, the panel wall system 1 and the frame assembly 3 are constructed and leveled with respect to the supporting floor surface 4, as shown in FIG. 1. The door frame assembly 22 is then attached to the adjusted frame assembly 3 using fasteners 88, or equivalent, as shown in FIGS. 11-12. Particular adjustments of the relative vertical location of the latch and hinge slider members 80 are then made with respect to the associated door jamb assemblies 30, 32. Referring again to FIG. 6, longitudinally extending interior passage or channel 70 includes a bottom wall 72 and side walls 74. Tab members 76 are disposed at the opening 78 of the channel 70, thereby defining a generally T-shaped configuration of the channel 70. Guides 79 are disposed on the bottom wall 72 of channel 70 and are used to guide positioning fasteners 86, securing fasteners and the slider member 80 in assembly.

Figure 10:
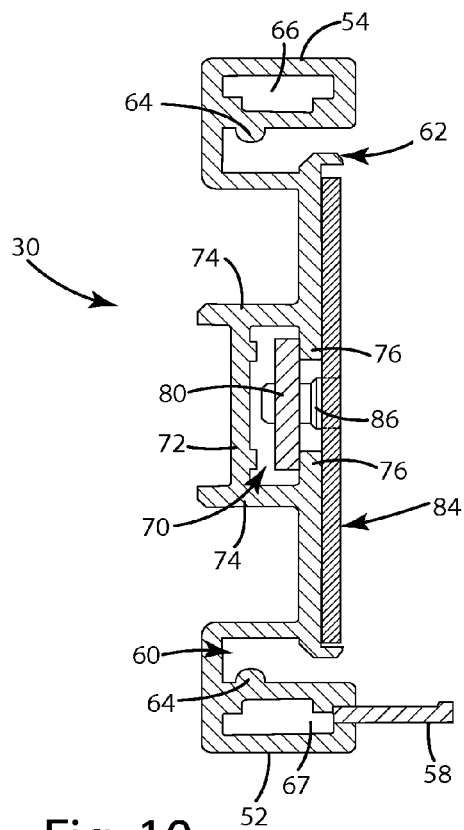
FIG. 10 is a top plan view of the door jamb assembly of FIG. 8.

Referring to FIGS. 10-12, the slider member 80 is set within the channel 70 by tightening multiple positioning fasteners 86 which are spaced along a length of slider member 80 in assembly, so as to sandwich a portion of the slider member 80 against the tabs 76 of channel 70. Fasteners 86 pass through apertures on the hinge mounting plate 84 to create the pinching effect on the slider member 80 to temporarily hold the slider member 80 in place along channel 70. The tightening of the positioning fasteners 86 in this way at least temporarily secures slider member 80, and hinge mounting plates 84 coupled thereto, at a selected vertical position with respect to the door jamb assembly 30. As shown in FIG. 11, once properly positioned for securing a door member thereto, a plurality of self-tapping fasteners are then extended through pre-drilled apertures 81 spaced along the length of the slider members 80 and through the bottom wall 72 of channel 70, thereby fixedly securing the relative vertical position of the slider member 80 and hinge mounting plates 84 with respect to the door jamb assembly 30. Referring to FIG. 12, once the slider member 80 is fitted in the selected vertical position, the outer cover member 82 may then be snap-fit or otherwise coupled to the jamb housing 50 by inserting engagement arms 90, 92, disposed on opposite sides of the cover member 28, into channels 60, 62 of the jamb housing 50, such that receiving portions 94, 96 of the engagement arms 90, 92 couple to the engagement ridges 64 of channels 60, 62. Hinge assemblies 100 are then mounted on the hinge mounting plates 84, as covered by the cover member 82, to operably support the door member 24 from the door frame assembly 22.

Figure 13:
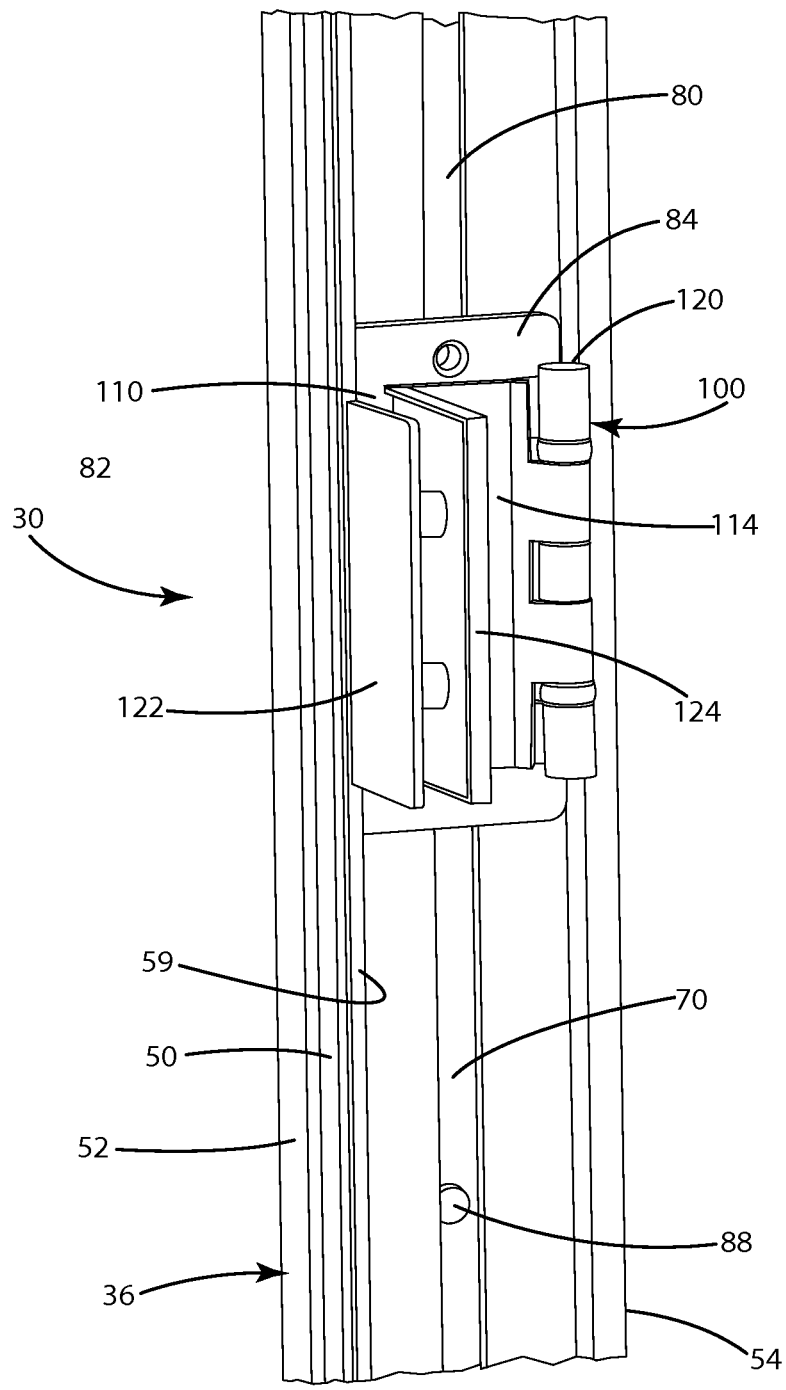
FIG. 13 is a perspective view of a lower portion of a door jamb assembly having a hinge member mounted thereon.
Figure 14A:
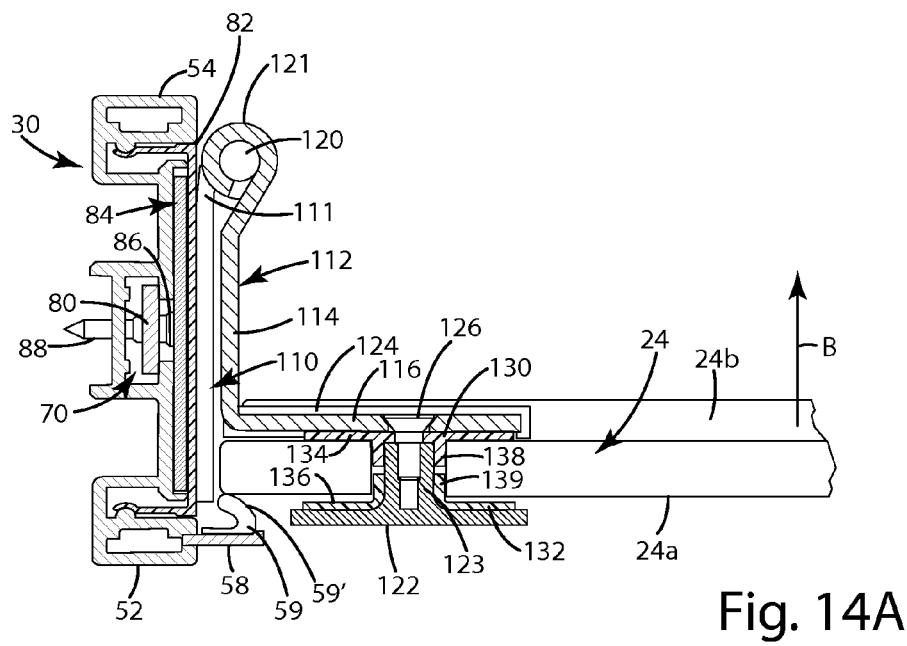
FIG. 14A is a top plan view of a door jamb assembly having a hinge member mounted thereon.
Figure 14B:
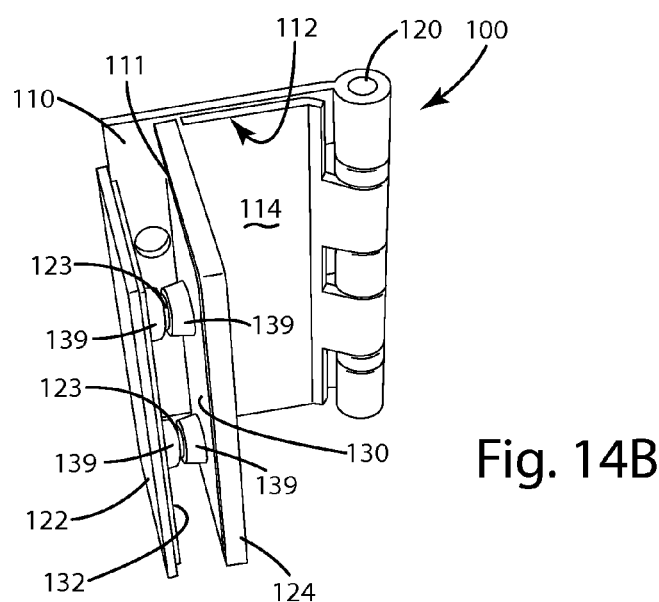
FIG. 14B is a perspective view of a hinge member.
Figure 16:
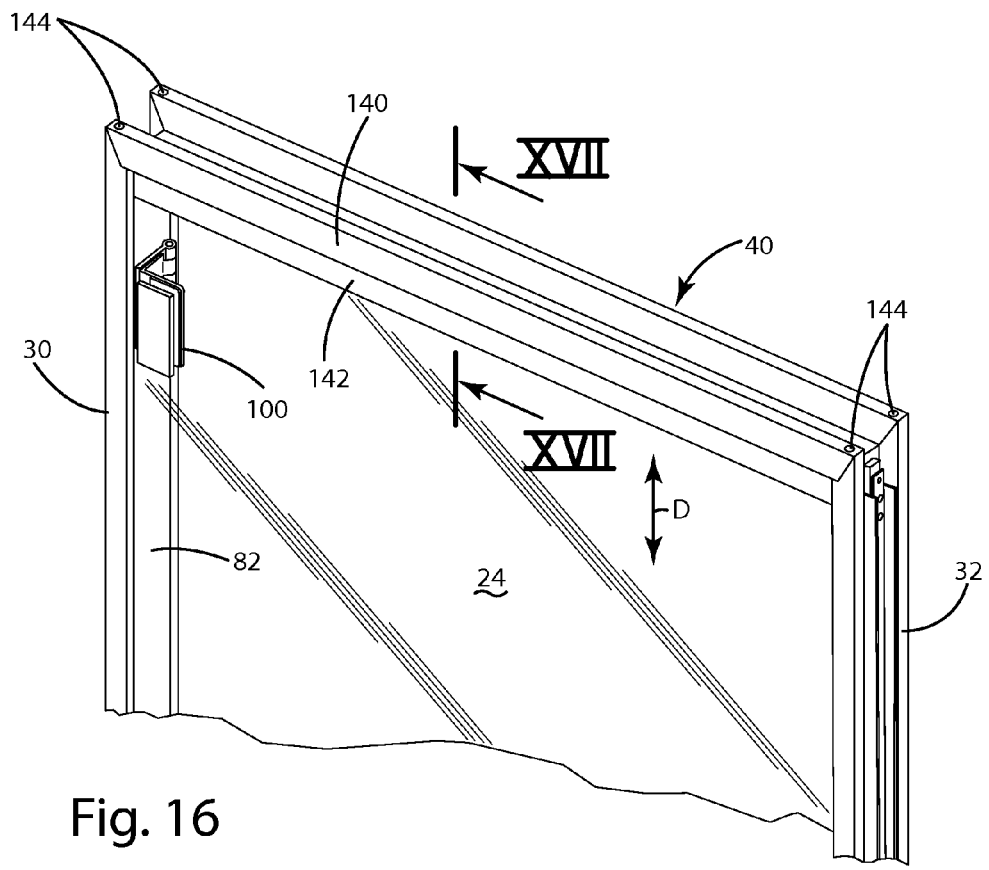
FIG. 16 is a perspective view of a door assembly having a header assembly.

One or more hinge assemblies 100 are provided so as to operably support a door member 24 from the door frame assembly 22. As best illustrated in FIGS. 13-14B, and with reference to a hinge assembly 100 for a glass door member 24 (FIG. 2), each hinge assembly 100 includes a substantially planar first hinge member 110 and an L-shaped second hinge member 112 having a first portion 114 and a second portion 116 extending substantially orthogonally from the first portion 114, and a pivot pin 120 pivotally attaching the second hinge member 112 to the first hinge member 110 at a pivot point 121 that is spaced away from the door jamb assembly 30 by angle 111 as found on first hinge member 110 to provide clearance for the movements of the hinge assembly 100 with respect to the door jamb assembly 30. The first hinge members 110 couple to the hinge mounting plates 84 in assembly. As best shown in FIG. 14A, each hinge assembly 100 further includes an attachment plate 122 disposed on an outer side 24a of the door member 24. Second portion 116 of the second hinge member 112 aligns with the attachment plate 122 on an inner side 24b of the door member 24, thereby sandwiching door member 24 there between. Second portion 116 of the second hinge member 112 is covered by an aesthetic cover 124 in assembly that is positioned on second portion 116. Each attachment plate 122 includes tubular-shaped boss portions 123 extending orthogonally from the attachment plate 122 through pre-formed apertures disposed in the door member 24. As shown in FIG. 14B, the attachment plate includes upper and lower tubular-shaped boss portions 123. Each hinge assembly 100 further includes a pair of grommets or seals 130, 132, each having a planar portion 134, 136 aligned with the second portion 116 of the second hinge member 112 and the attachment plate 122. The grommets or seals 130, 132 ensure that there is no metal on glass contact in the coupling of the door member 24 to hinge assembly 100. The grommets 130, 132 further include tubular-shaped boss portions 138, 139 adapted surround the tubular-shaped boss portion 123 of the attachment plate 122 which houses fasteners 126 that secure the attachment plate 122 to the second portion 116 of the second hinge member 112, thereby sandwiching and securing the glass door member 24 to the hinge assembly 100.

As shown in FIG. 14A, the L-shaped second hinge member 112 provides an offset for the hinge member 100 such that the glass door member 24 is disposed adjacent to and in near planar alignment with front first side 52 of the door jamb assemblies 30, 32. The offset hinges also help to align the glass door members 24 with adjacent panels 6 in assembly as shown in FIG. 1 to provide a uniform appearance. As shown in FIG. 14A, the hinge assembly 100 is designed to allow the glass door member 24 to open inwardly into a room, or other adjacent area, as indicated by arrow B. As such, the hinge assembly 100 shown in FIG. 14A is a left hinge configuration and make for a left hand door configuration for door member 24. It is noted that a seal finger 59' disposed on seal strip 59 is a resilient seal finger that will be depressed towards door stop 58 as contacted by the door member 24 in assembly.

As noted above, the hinge assemblies 100 are reversible, such that the hinge assemblies can be used on either door jamb assembly 30, 32. As shown in FIG. 15A, the hinge assemblies 100 are mounted to left door jamb assembly 30 with the offset of the hinge assembly positioning the glass member 24 adjacent to and in planar alignment with the front or first side 52 of the door jamb assemblies 30, 32. Thus, the glass door member 24, as shown in FIGS. 14A and 15A would open inwardly into an area along a path as indicated by arrow B, such that the door assemblies shown in FIGS. 14A and 15A have left hand door configurations.

As shown in FIG. 15B, and with comparison to FIG. 15A, the hinge assemblies 100 have been mounted to door jamb assembly 32 after they have been rotated vertically relative to the hinge assemblies 100 of FIG. 15A. Due to the vertical rotation, the hinge assemblies 100, as found on the door assembly 20 of FIG. 15B, the glass door member 24 also opens inwardly into a room, thus making this door configuration a right hand door configuration. With reference to the door configurations shown in FIGS. 15A and 15B, both glass door members 24 are offset to be adjacent to and in near planar alignment with the front walls of first sides 52 of the door jamb assemblies 30, 32.

Figure 17:
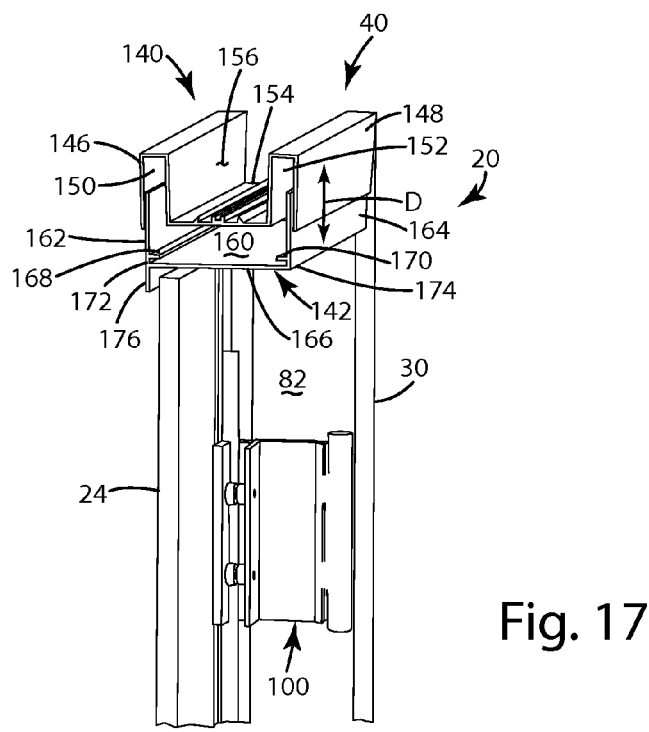
FIG. 17 is a cross-sectional view of a header assembly of FIG. 16.

Referring now to FIGS. 16-18A, the header assembly 40 is vertically adjustable so as to account for the vertical adjustability of the door frame assembly 22 and the pivotally coupled door member 24. The adjustability of the header assembly 40 provides a constant and consistent aesthetic outer appearance, and helps keep the lines of the panel wall system uniform. In the illustrated example of FIG. 16, the header assembly 40 includes a first or upper header member 140 and a second or lower header member 142 which is vertically adjustable in a direction as indicated by arrow D with respect to the first header member 140. The first header member 140 is fixedly secured to the door jamb assemblies 30, 32 via fasteners 144 as further described below. As best illustrated in FIG. 17, the first header member 140 includes a first side 146 and a second side 148 which include downwardly opening channels 150, 152, respectively. A body portion 154 connects first side 146 and second side 148, and is configured as an upwardly opening channel 156 disposed in the middle of header member 140 which receives a frame member of the frame assembly 3 of the panel wall system 1 in assembly. The adjustable second header member 142 is provided generally in the form of a C-shaped upwardly opening channel 160. Second header member 142 includes a first side wall 162 and a second side wall 164 with a body portion 166 connecting first side wall 162 and second side wall 164. In assembly, the first side wall 162 and the second side wall 164 are received in the downwardly opening channels 150, 152 of the first header member 140. Flocking tape may be used to soften the connection of the first and second side walls 162, 164 with the channels 150, 152 to eliminate metal-to-metal contact or interaction between mating surfaces that these connecting surfaces. Tab portions 168, 170 extend orthogonally from the first side wall 162 and the second side wall 164 into the C-shaped channel 160, thereby defining lateral channels 172, 174 respectively for connecting to a bracket member 180 as further described below. The first side 162 further comprises a door stop flange 176 which is adapted to engage the door member 24 at an outer side of the door member 24a in assembly and may include a seal strip, such as seal portion 58 shown in FIG. 6. Thus, in assembly, the door assembly, includes door stop flanges 58 disposed on the upright door jamb assemblies 30, 32 and a door stop flange 176 disposed on the header assembly 40, such that the door member 24 can engage a seal, such as seal 59 shown in FIG. 6, about a periphery of the door member 24 as disposed on the door stop flanges 58 and 176.

Referring now to FIGS. 18A and 18B, the first header member 140 is connected to the door jamb assembly 32 using a bracket 300 wherein the bracket includes a body portion 302 with a tab 304 extending downwardly therefrom and having an aperture 305 disposed thereon. The bracket member 300 further includes a first side and second side 306, 308 having downwardly extending tab portions 310, 312. In assembly, the first and second sides 306, 308 are disposed in the downwardly opening channels 150, 152 of the first header member 140 and are configured to follow the contours of the downwardly opening channels 150, 152 as shown in FIGS. 18A and 18B. Fasteners 144 are then fastened through the first header member 140 to operably couple to the first and second sides 306, 308 of the bracket member 300. A fastener 145 is used to secure the bracket member 300 to the body portion 154 of the first header member 140. The fastener 145 is inserted through a predrilled aperture 307 disposed on body portion 302 of the bracket member 300, and engages the body portion 154 of the first header member 140 in assembly. The tab portions 310, 312 are then inserted into the door jamb assembly at channels 66 and 67 as shown in FIG. 6. The tab portion 304 is adapted to connect to a bracket plate 320 as shown in FIG. 18B. In FIG. 18B, door jamb assembly 32 is shown in phantom such that mounting plate 320 can be shown disposed within the channel 70 of the door jamb assembly 32. A fastener 143 is used to couple the mounting plate 320 to the downward tab 304 at aperture 305. The mounting plate 320 is secured to channel 70 of the door jamb assembly 32 via fasteners 147 which are couple to the bottom wall 72 of the channel 70.

Figure 18C:
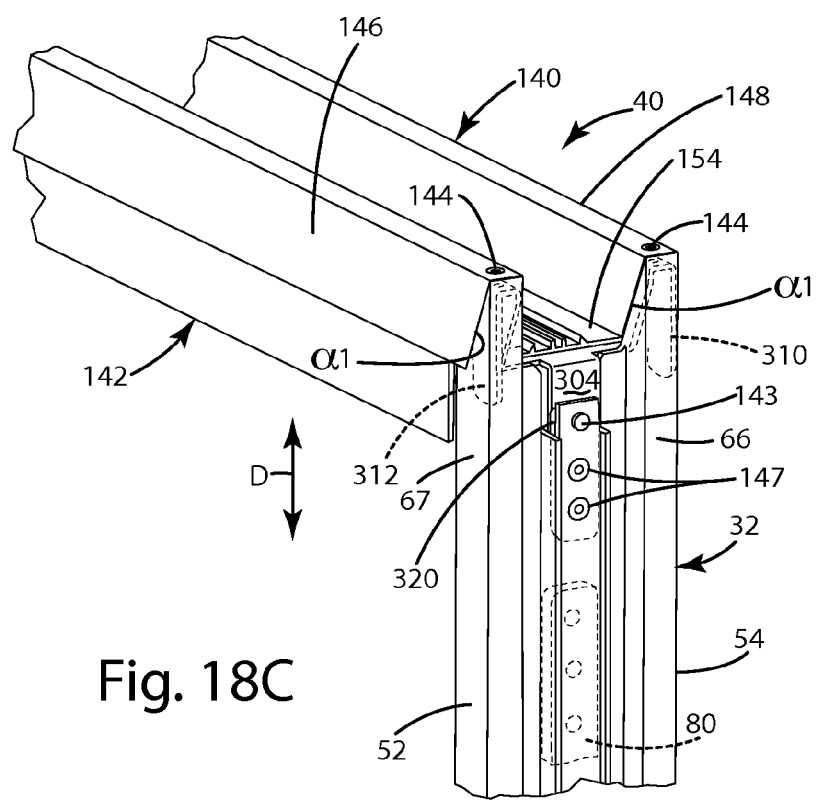
FIG. 18C is a perspective view of the header assembly and a connecting bracket of FIG. 18A shown assembled.
Figure 18D:
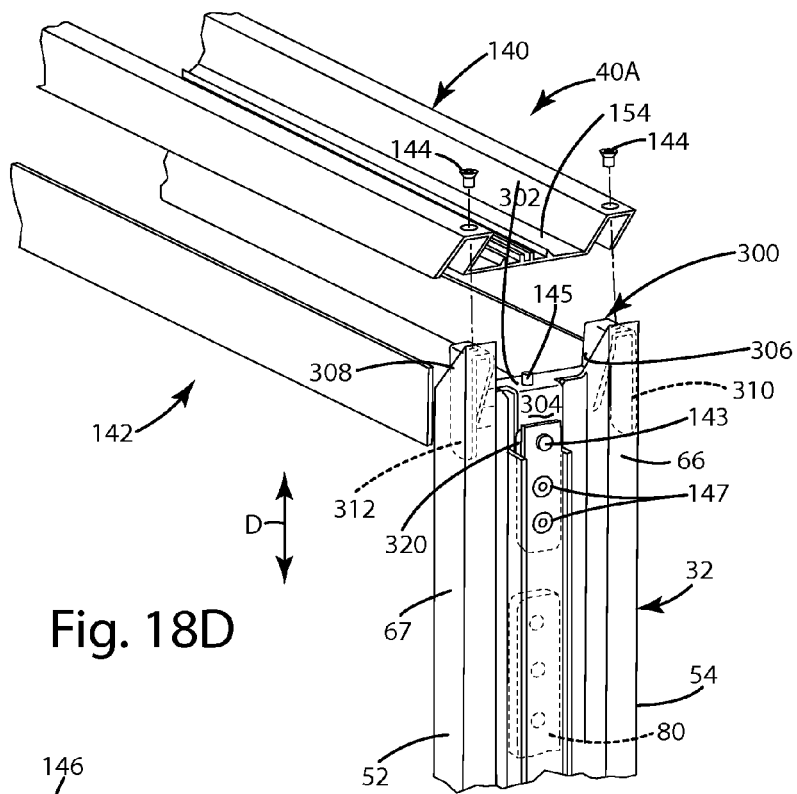
FIG. 18D is an exploded perspective view of a header assembly and a connecting bracket according to another embodiment.
Figure 18E:
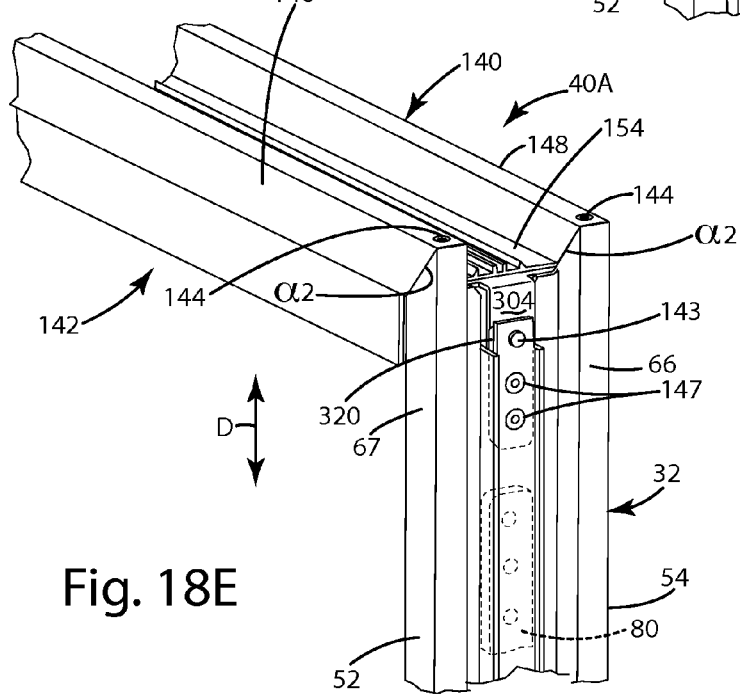
FIG. 18E is a perspective view of the header assembly and a connecting bracket of FIG. 18D shown assembled.

Referring now to FIGS. 18D and 18E, a header assembly 40A is shown according to another embodiment. Header assembly 40A is similar to header assembly 40, as described above with reference to FIGS. 16-18A, such that the same reference numerals used to describe header assembly 40 will be used to describe header assembly 40A. Header assembly 40A, however, is a lower profile header assembly as compared to header assembly 40. Being a header assembly of a lower profile, the first header member 140 of header assembly 40A is a shorter header member as compared to first header member 140 of header assembly 40. Thus, the mitered angle α2 between the first and second sides 52, 54 of door jamb assembly 32 and the first side 146 and a second side 148 of the header member 140 is a less severe angle as compared to the mitered and angle α1 as shown in FIG. 18C. As shown in FIGS. 18D and 18E, header assembly 40A a second or lower header member 142 which is vertically adjustable in a direction as indicated by arrow D with respect to the first header member 140 in a similar manner as described above with reference to FIGS. 16 and 17.

Figure 19A:
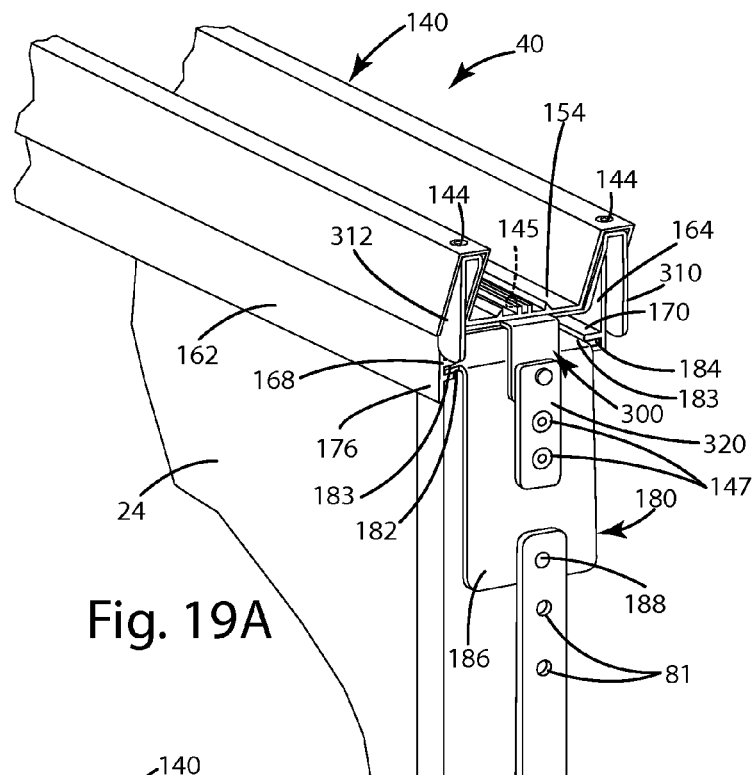
FIG. 19A is a perspective view of a header assembly and a connecting bracket.
Figure 19B:
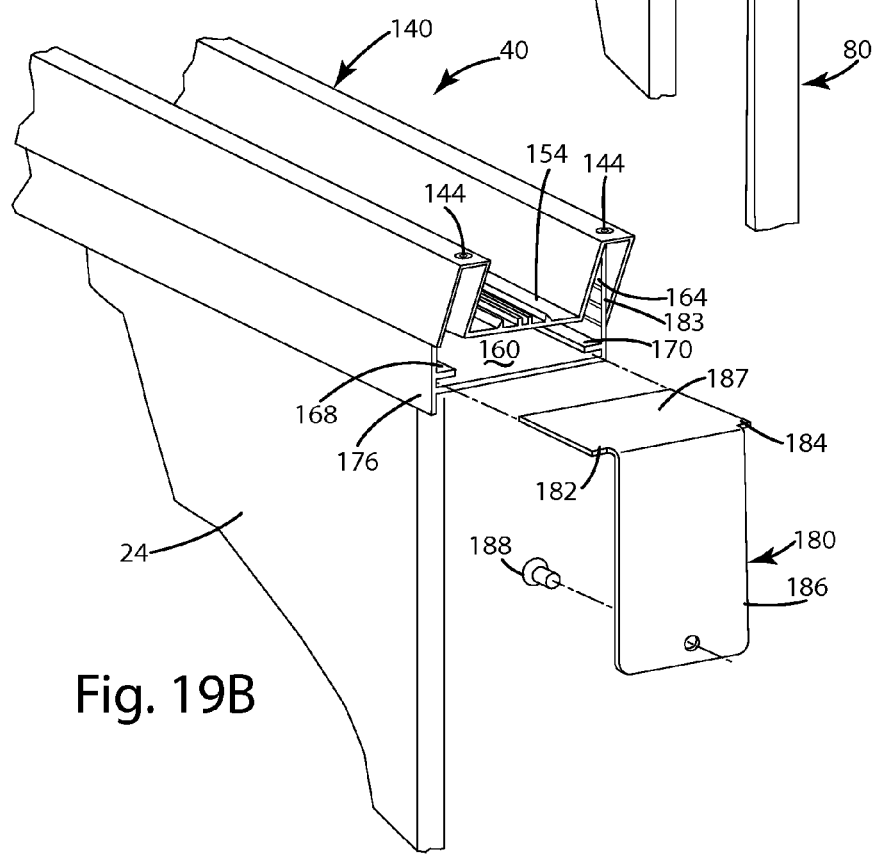
FIG. 19B is an exploded view of a header assembly and a connecting bracket.

In assembly, door assembly 20 is secured to the overall frame assembly 3 at a selected vertical relative position. The adjustable header member 142 is then vertically adjusted with respect to the fixed header member 140 to provide the proper aesthetic appearance for the overall header assembly 40. As shown in FIGS. 19A and 19B, the adjustable header assembly 142 is then secured to the door jamb assemblies 30, 32 by L-shaped end brackets 180 which include a first portion 186 and second portion 187, the second portion 187 including tabbed-ends 182, 184 that are received in the channels 172, 174 of the adjustable header assembly 142. Mechanical fasteners 188 are used to secure the first portion 186 of the L-shaped end brackets 180 to the slider member 80 as disposed in channel 70 of the door jamb assemblies 30, 32, thereby fixing the vertical position of the adjustable header member 142 with respect to the fixed header member 140.

Figure 21:
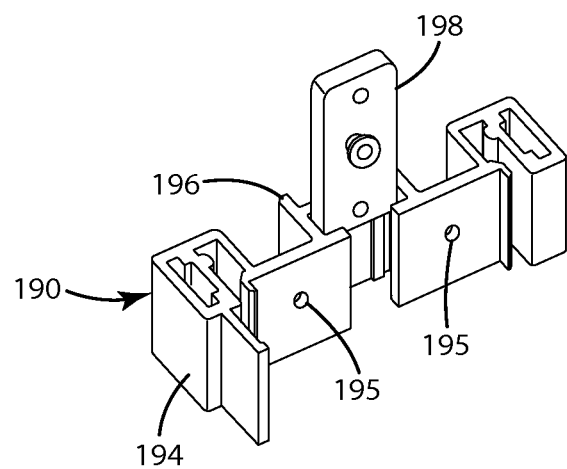
FIG. 21 is a perspective view of the plinth assembly of FIG. 20.
Figure 23:
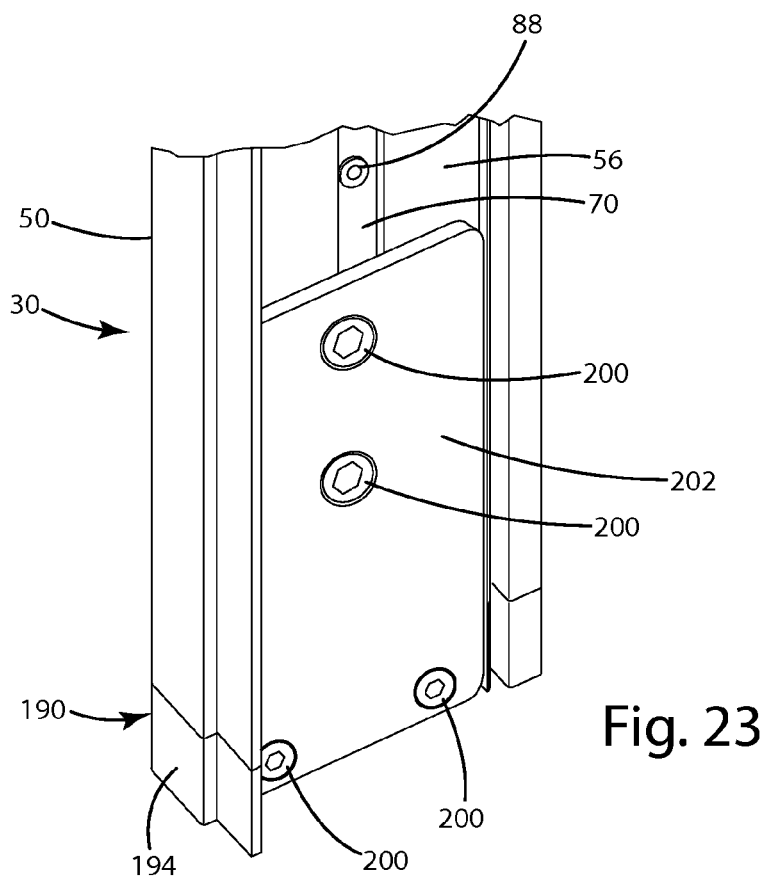
FIG. 23 is a perspective view of a lower portion of a door jamb assembly having a plinth assembly disposed thereon.

Subsequent to the vertical positioning of the door jamb assemblies 30, 32 with respect to the frame assembly 3, a gap may exist between the bottom ends of the jamb housings 50, 52 and the supporting floor surface 4. As shown in FIG. 2, plinth assemblies 190, 192 are provided to fill the gaps as created. Referring now to FIGS. 20-23, each plinth assembly 190, 192 includes a housing member 194 having a cross-sectional configuration similar to the corresponding door jamb housing 50 with mounting apertures 195 disposed thereon. As shown in FIG. 21, a first mounting plate 198 is slidably received within an interior passage 196 of the housing member 194 and the interior passage or channel 70 of the associated jamb housing 50, and secured thereto with a fastener 200 as shown in FIG. 22. As shown in FIG. 23, a second mounting plate 202 is coupled to the first mounting plate 198 using fasteners 200, such that the first mounting plate 198 and the second mounting plate 202 are drawn together by fasteners 200 to clamp the housing member 194 and the body portion 56 of the associated jamb housing 50 therebetween, thereby securing the plinth assembly 190 to the door jamb housing 50. An aesthetic cover member 204 is snap-fit or otherwise coupled to the housing member 194 similar to the outer cover member 82 being snap-fit to the associated jamb housings 50.

Figure 24A:
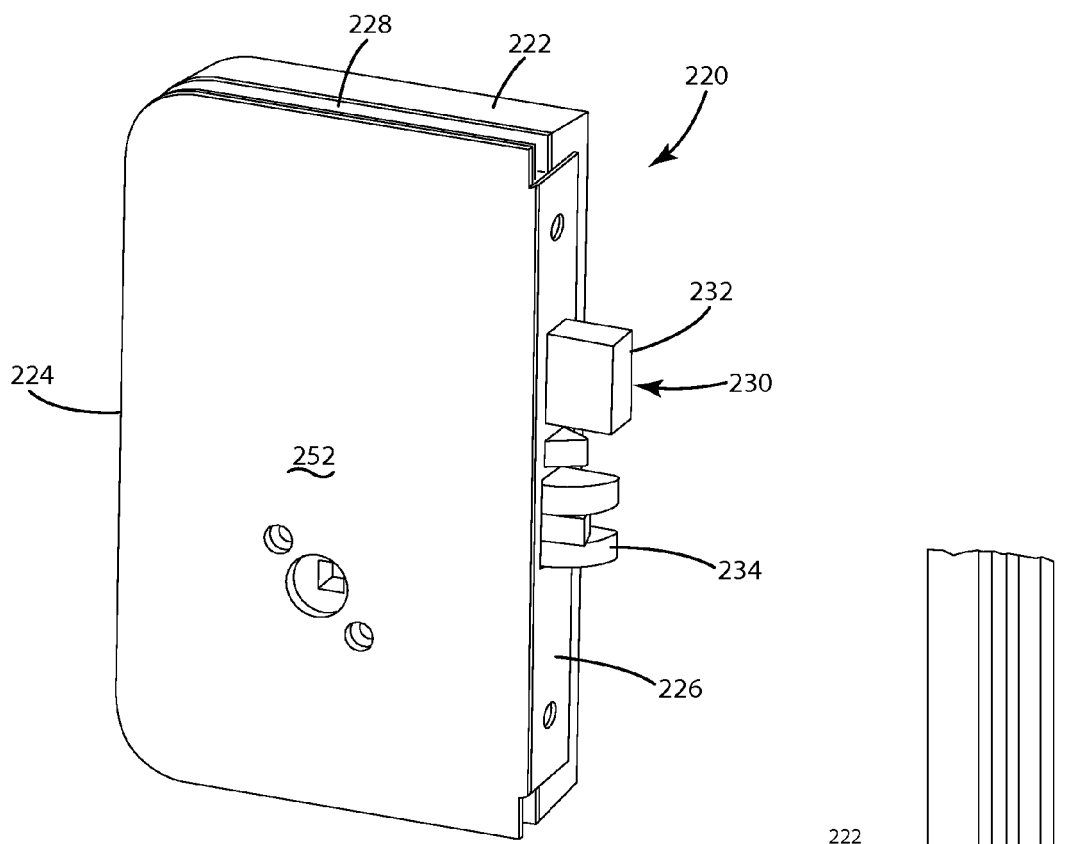
FIG. 24A is a perspective view of a clamping bezel assembly.
Figure 24B:
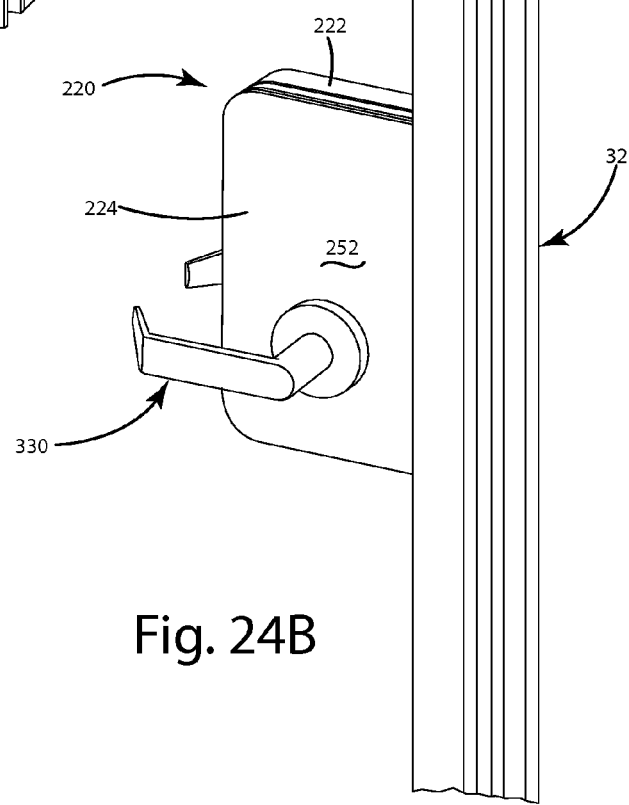
FIG. 24B is a perspective view of a clamping bezel assembly having a handle member.

Referring now to FIGS. 24A-33, the door assembly 20 further includes a latch or lock set bezel assembly 220. The bezel assembly 220, as illustrated in FIG. 24A, is a rectangularly-shaped door handle bezel assembly 220 for housing a latch mechanism 230. The bezel assembly 220 is configured to interact with a latch striker plate 85 fixedly secured to an associated door jamb assembly 32 as shown in FIG. 8B. The bezel assembly 220 includes a housing member 222 and a cover member 224 and a face plate 226 which surround the latch mechanism 230 in assembly. The latch mechanism 230 shown in FIG. 24 includes a deadbolt 232 and a latch member 234. It is further contemplated that a roller latch may be disposed within the bezel assembly 220 for a door configuration that does not lock in place or require a handle member, such as handle member 330 shown in FIG. 24B.

Figure 25:
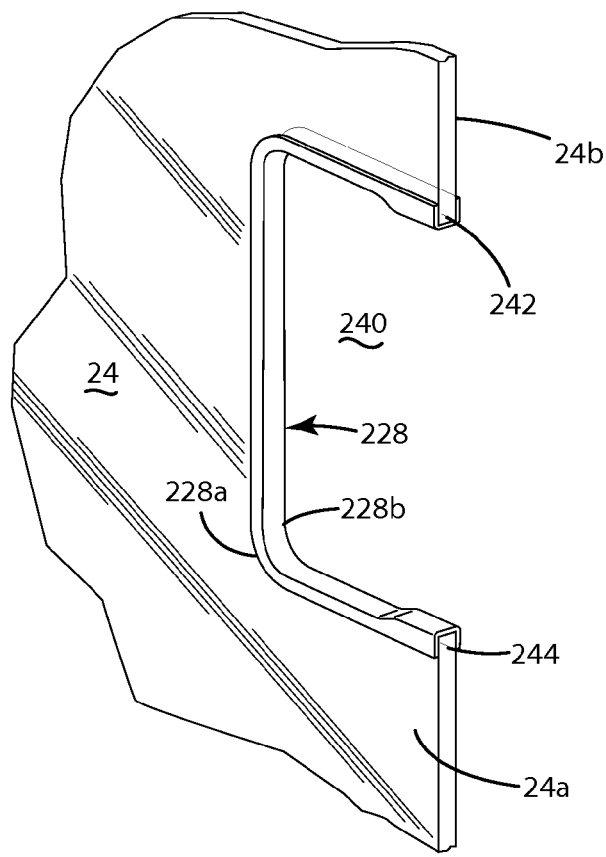
FIG. 25 is a perspective view of a glass door member having a bezel relief.
Figure 26:
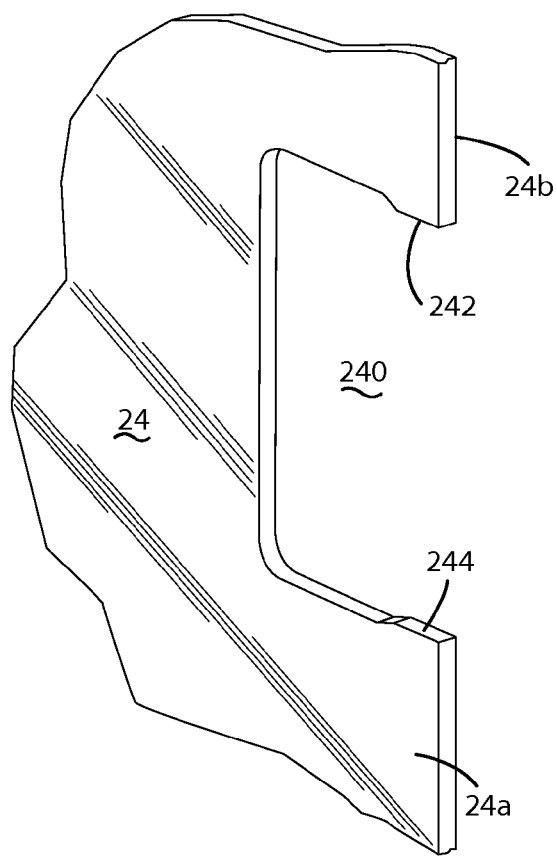
FIG. 26 is a perspective view of the glass door member of FIG. 25 having a grommet assembly disposed thereon.

As best shown in FIGS. 25 and 26, a grommet assembly 228 has a cover side 228a and a housing side 228b, wherein the cover side 228a is adapted to engage a first side 24a of a door member 24, and further wherein the housing side 228b is adapted to engage a second side 24b of a door member 24 at a relief section 240 disposed on the door member 24 adjacent a periphery thereof. In assembly, the grommet 228 ensures that there is no glass to metal contact at the relief 240 and bezel 220 connection. The relief section 240 of the door member 24 further comprises an upper retaining feature 242 and a lower retaining feature 244 to help retain the bezel assembly 220 in place in the relief 240 of the door member 24, and the overall shape of the relief 240 corresponds to the rectangular shape of the bezel assembly 220.

Figures 27, 28:
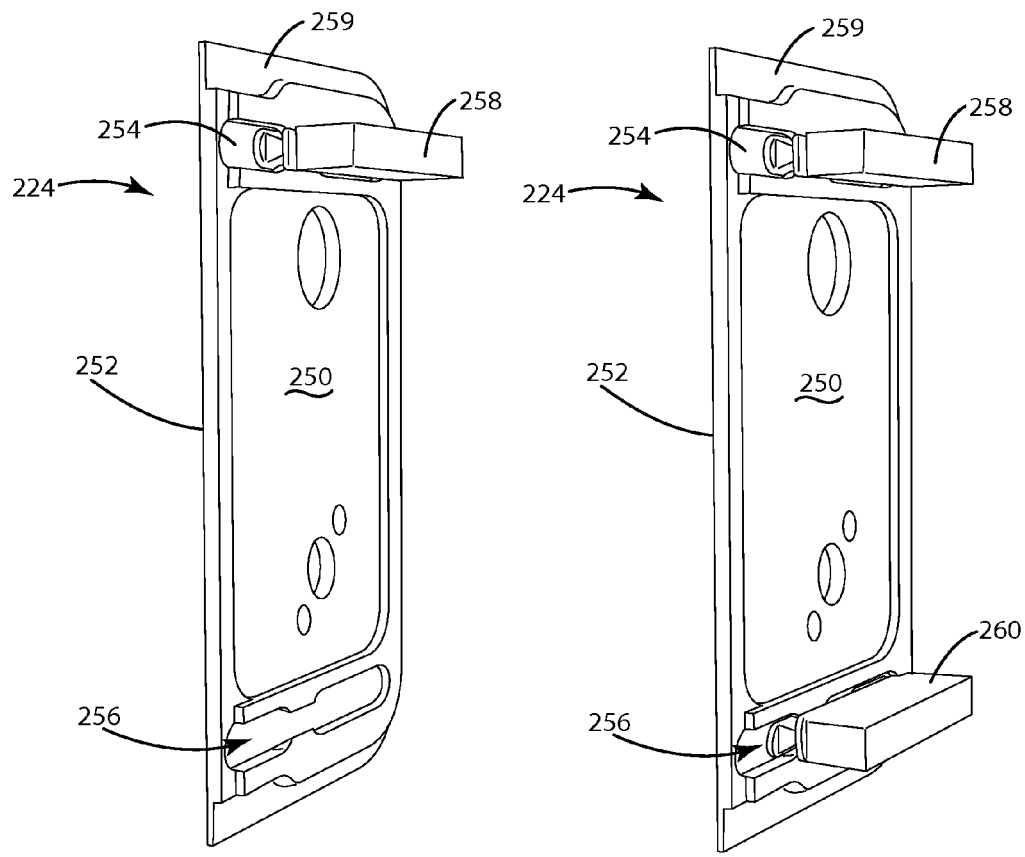
FIG. 27 is a perspective view of a cover member for a bezel assembly having a clamping assembly disposed thereon.
FIG. 28 is a perspective view of the cover member of FIG. 27 having a second clamping assembly disposed thereon.

As shown in FIGS. 24A and 27, the cover 224 has an inner surface 250 and an outer surface 252, wherein the inner surface 250 includes upper and lower slots 254, 256 which are adapted to engage an upper clamping member 258 and a lower clamping member 260 shown in FIG. 28. The cover 224 further includes a channel 259 which is disposed about a periphery of the cover 224 and adapted to receive the cover side 228a of the grommet assembly 228 in assembly.

Figure 29:
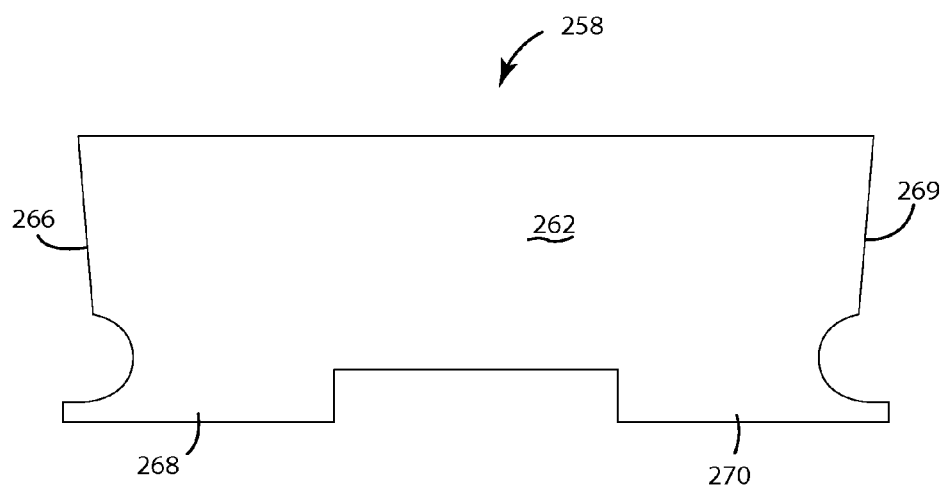
FIG. 29 is a top plan view of a clamping assembly.

As best shown in FIG. 29, each clamping member 258, 260 includes a body portion 262, a rearward angled abutment surface 264 and a forward angled wedge surface 266. Each clamping assembly 258, 260 further includes a pair of dovetailed shaped engagement portions 268, 270 extending outwardly from the body portion 262 that are received within the slots 254, 256 disposed on the inner surface 250 of the cover member 224, as shown in FIG. 28.

Figure 30:
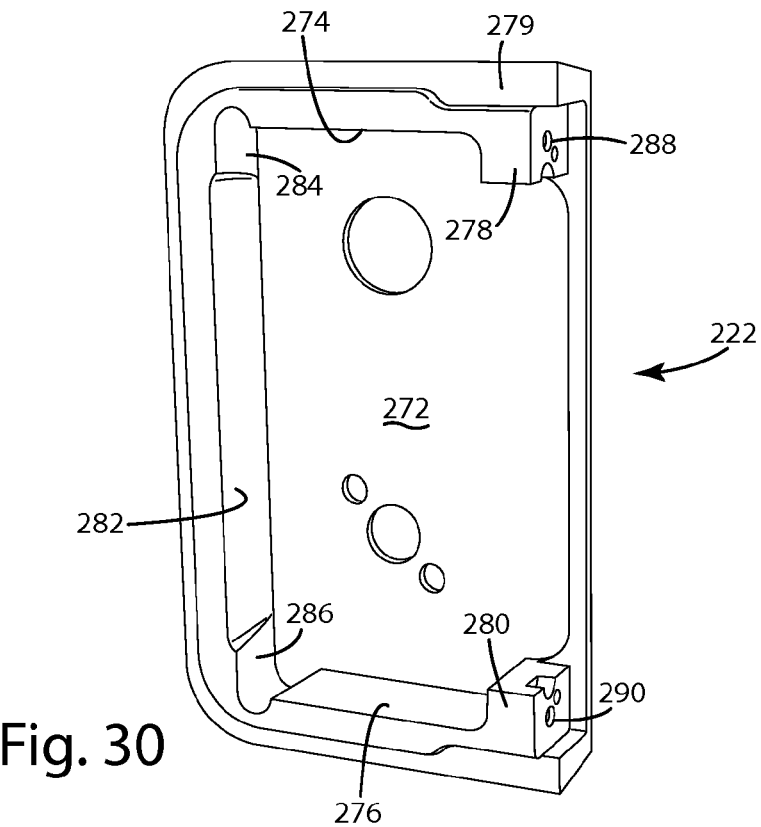
FIG. 30 is a perspective view of a housing member for a bezel assembly.
Figure 31:
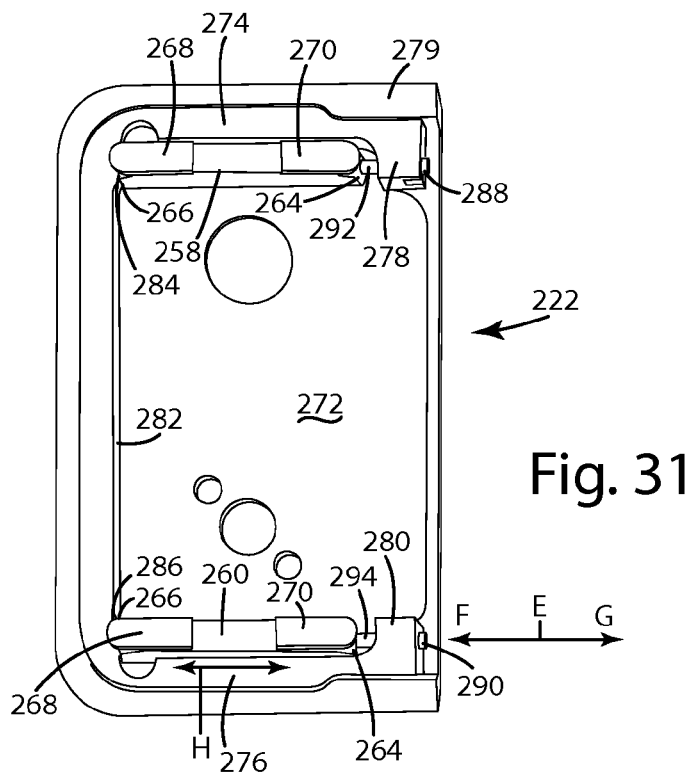
FIG. 31 is a perspective view of a housing member having clamping assemblies disposed therein.
Figure 32:
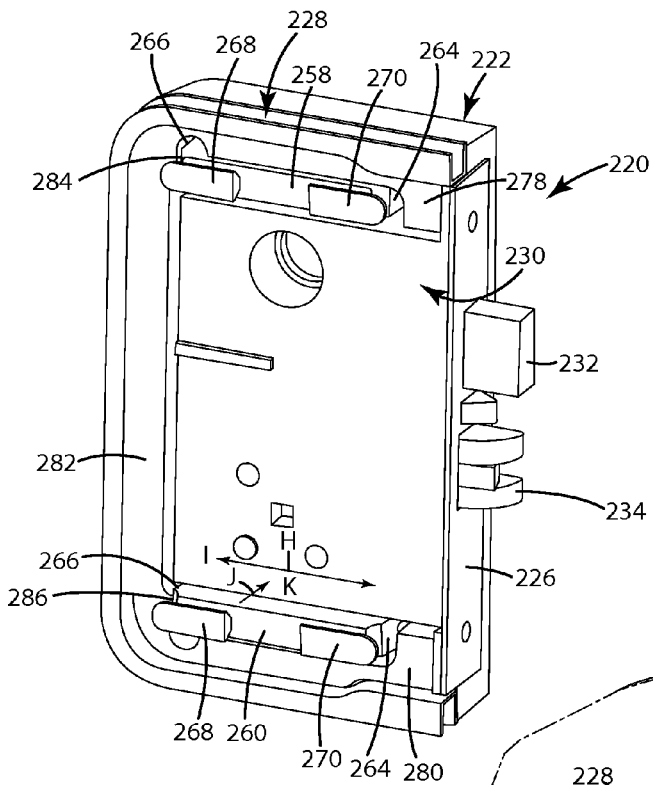
FIG. 32 is a perspective view of the housing member of FIG. 31 having a latch mechanism disposed therein.
Figure 33:
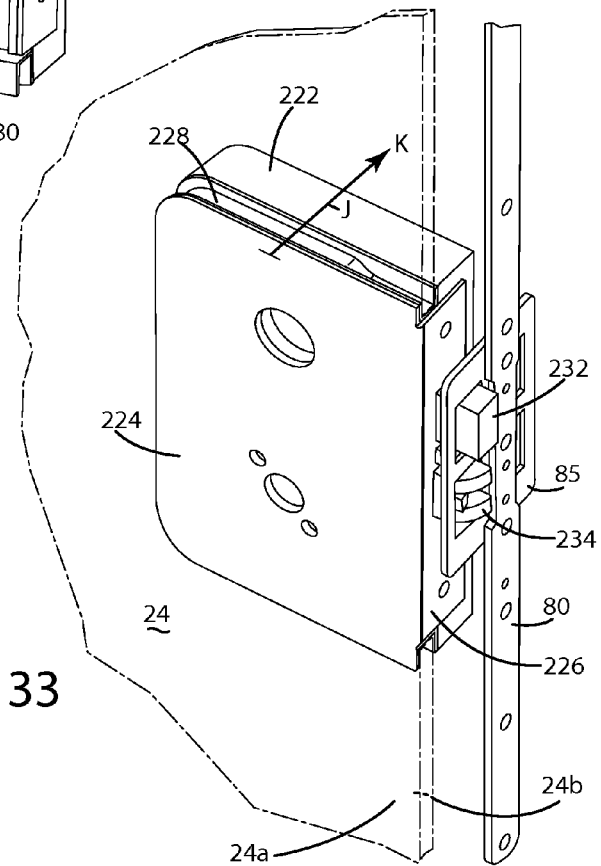
FIG. 33 is a perspective view of a clamping bezel assembly as clampingly fixed on a glass door member.

As shown in FIG. 30, the housing member 222 includes a latch housing cavity 272 having upper and lower walls 274, 276, front upper and lower tab portions 278, 280 and a rear wall 282. The housing cavity 272 is adapted to receive a latch mechanism, such as mortise latch 230 shown in FIGS. 24 and 32. The housing member 222 further includes a channel 279 which is disposed about a periphery of the housing member 222 and adapted to receive the housing side 228b of the grommet assembly 228 in assembly. The rear wall 282 of the housing member 222 includes upper and lower angled wedge surfaces 284, 286 which are complimentary to the angled wedge surfaces 266 of the clamping members 258, 260 which are received adjacent the upper and lower walls 274, 276 of the housing cavity 272 in assembly as shown in FIGS. 31 and 32. The upper and lower tab portions 278, 280 include threaded apertures 288, 290 which are adapted to engage drive members 292, 294 as shown in FIG. 31. The drive members 292, 294 can be threaded into and out of the threaded apertures 288, 290 such that the drive members 292, 294 abut and engage the abutment surfaces 264 of the clamping members 258, 260 in assembly. As shown in FIG. 31, drive member 294 engages angled abutment surface 264 of clamping member 260. Specifically, drive member 294 is moveable in a direction as indicated by arrow E between engaged and retracted positions F and G. As drive member 294 is moved to the engaged position F, drive member 294 wedgingly engages angled abutment surface 264 of clamping member 260, such that clamping member 260 moves in a first direction indicated by arrow H towards a clamping position I, wherein direction H is parallel to the movement of the drive member 294. Due to the wedging engagement of the drive member 294 and the angled abutment surface 264, the clamping member 260 also moves in a second direction indicated by arrow J further into the housing cavity 272. As clamping member 260 moves to the clamping position I, angled wedge surface 266 acts on angled wedge surface 286 of the housing member 222, thereby driving clamping member 260 in the second direction indicated by arrow J further into the housing cavity 272 towards a clamped position K. Thus, the movement of the drive member 294 in the direction indicated by arrow E to the engaged position F, moves the clamping member 260 in a direction indicated by arrow H, which is parallel to direction E, to a clamping position I, wherein the clamping member 260 engages the angled wedge surface 266 of the clamping member 260 acts on angled wedge surface 286 of the housing member 222 to drive the clamping member 260 in a second direction J which is directed into the housing cavity 272 and is perpendicular to directions E and H. Thus, the angle of the angled wedge surface 266, the angled abutment surface 264 and the angled wedge surface 286 of the housing member 222 work in concert to define the amount of movement the bezel assembly 220 can accommodate. Further, as noted above, the clamping member 260 is also driven in the second direction J by the wedging engagement of the drive member 294 and the angled abutment surface 264. Thus, the drive mechanism imparts a clamping force on the clamping member 260. A similar series of movements occurs between the upper clamping member 258 and drive member 292. Thus, as the clamping members 258, 260 are coupled to the slots 254, 256 of the cover member 224 as shown in FIG. 27, with the body portions 262 of the clamping members 258, 260 disposed within the housing member 222 as shown in FIGS. 31 and 32, the drive members 292, 294 drive the cover member towards the housing member 222 in a direction indicated by arrow J, as shown in FIG. 31, to fixedly clamp the door member 24 and the grommet assembly 228 therebetween. In this way, the wedging movement of the bezel assembly 220 accommodates for variations in the size or thickness of the glass of the door member 24, the grommet assembly 228, and the thickness of the housing member 222 and cover member 224. Further, the wedging clamp technology eliminates the use of fasteners that pass through the housing member 222 and cover member 244, thereby providing a cleaner aesthetic appearance on the outer surfaces thereof.

It is noted that the grommet assembly 228 resides in channels 259, 279 of the cover member 224 and the housing member 222 in assembly. The grommet assembly 228 and the channels 259, 279 comprise reliefs adapted to receive the retaining features 242, 244 disposed on the door member 24 at relief 240. In assembly, the engagement features 242, 244 help cooperate to resist lateral removal of the bezel assembly 220 from the door member 24.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A modular wall assembly, comprising:
 a frame assembly;
 a first door jamb assembly and a second door jamb assembly operably coupled to the frame assembly and disposed in a generally parallel, laterally spaced-apart relationship, and configured to be abuttingly supported on a floor surface at lower portions thereof in a generally upright orientation, each door jamb assembly including a jamb housing defining a longitudinal extending channel having an inner surface disposed along a length of the jamb housing;
 a header assembly having opposite ends thereof operably connected to upper portions of the first and second door jamb assemblies to define a door opening;
 a door member operable between a closed position, wherein the door member is at least partially located within the door opening, and an open position, wherein the door member is at least partially removed from the door opening to allow ingress and egress through the door opening;
 a first slider member slidably received in the channel of the jamb housing of one of the first door jamb assembly and the second door jamb assembly, the slider member having one or more mounting plates adapted to receive a hinge assembly for operable coupling the door member to the slider member; and
 wherein the first slider member is vertically adjustable along a length of the channel of the door jamb housing, and further wherein the inner surface of the longitudinal extending channels of the first and second door jambs opens inwardly towards the door opening.

2. The modular wall assembly of claim 1, including:
 a second slider member slidably received in the channel of the jamb housing of one of a first door jamb assembly and a second door jamb assembly, and opposite the door jamb assembly having the first slider member slideably received therein, the second slider member having a latch striker disposed thereon.

3. The modular wall assembly of claim 2, wherein, the second slider member is vertically adjustable along a length of the channel of the door jamb housing.

4. The modular wall assembly of claim 3, including:
 positioning fasteners disposed along a length of the first slider member and adapted to couple the slider member at a predetermined vertical height along the channel of the door jamb housing.

5. The modular wall assembly of claim 4, including:
 positioning fasteners disposed along a length of the second slider member and adapted to couple the slider member at a predetermined vertical height along the channel of the door jamb housing.

6. The modular wall assembly of claim 5, including:
plinth assemblies disposed on the lower portions of the first and second door jamb assemblies, wherein the plinth assemblies are coupled to the longitudinal extending channels of the jamb housings of each of the first and second door jamb assemblies.

7. The modular wall assembly of claim 2, wherein the header assembly includes a first header member having at least one channel having an inner surface opening downwardly towards the door opening, and a second header member at least partially received in the at least one channel of the first header member and vertically adjustable relative to the first header member, such that the second header member defines a vertically adjustable height of the door opening as the second header member is adjusted vertically relative to the floor surface.

8. A modular wall assembly, comprising:
a frame assembly;
a first door jamb assembly and a second door jamb assembly operably coupled to the frame assembly;
a header assembly including a first header member having at least one channel having an inner surface opening downwardly towards a door opening, the first header member operably connected to upper portions of the first and second door jamb assemblies to define the door opening, and a second header member at least partially received in the at least one channel disposed on the first header member; and
wherein the second header member is vertically adjustable relative to the first header member along the at least one channel of the first header member to adjust an overall size of the door opening.

9. The modular wall assembly of claim 8, wherein each door jamb assembly includes a longitudinal extending channel.

10. The modular wall assembly of claim 9, including:
a slider member slidably received in the channel of one of the first door jamb assembly and the second door jamb assembly, wherein the slider member is vertically adjustable relative to the door opening.

11. The modular wall assembly of claim 10, including:
a door member operable between a closed position, wherein the door member is at least partially located within the door opening, and an open position, wherein the door member is at least partially removed from the door opening to allow ingress and egress through the door opening, the door member hingedly supported on the slider member between the open and closed positions.

12. The modular wall assembly of claim 11, wherein the second header member includes one or more upwardly extending walls received in the at least one channel of the first header member.

13. The modular wall assembly of claim 10, including:
positioning fasteners disposed along a length of the slider member and adapted to couple the slider member at a predetermined vertical height along the channel of the door jamb assembly.

14. A modular wall assembly, comprising:
a frame assembly;
a vertically adjustable door assembly comprising;
a first door jamb assembly and a second door jamb assembly operably coupled to the frame assembly and disposed in a generally parallel, laterally spaced-apart relationship to define a door opening there between, each door jamb assembly including a longitudinal extending channel having an inner surface opening inwardly towards the door opening and adapted to be supported in a generally upright configuration relative to a floor surface;
a header assembly having opposite ends thereof operably connected to upper portions of the first and second door jamb assemblies;
a door member operable between a closed position, wherein the door member is at least partially located within the door opening, and an open position, wherein the door member is at least partially removed from the door opening to allow ingress and egress through the door opening;
a slider member slidably received in and vertically adjustable along a length of the channel of the first door jamb assembly; and
wherein the slider member hingedly supports the door member between the open and closed positions.

15. The modular wall assembly of claim 14, including:
positioning fasteners disposed along a length of the first slider member and adapted to couple the slider member at a predetermined vertical height along the channel of the first door jamb assembly.

16. The modular wall assembly of claim 15, wherein the header assembly includes a first header member having at least one channel, and a second header member at least partially received in the at least one channel of the first header member.

17. The modular wall assembly of claim 16, wherein the second header member is vertically adjustable relative to the first header member.

18. The modular wall assembly of claim 17, wherein the second header member defines a top portion of the door opening, such that the second header member defines a vertically adjustable height of the door opening as the second header member is adjusted vertically relative to the floor surface.

19. The modular wall assembly of claim 14, including:
a bezel assembly coupled to the door member and adapted to receive a latch mechanism.

20. The modular wall assembly of claim 19, wherein the bezel assembly includes a housing member and a cover member which are clampingly engaged with one another on opposite sides of the door member.

* * * * *